(12) United States Patent
Segawa

(10) Patent No.: US 8,365,275 B2
(45) Date of Patent: Jan. 29, 2013

(54) IMAGE PROCESSING APPARATUS, SESSION MANAGING METHOD AND SESSION MANAGING PROGRAM

(75) Inventor: Hidekazu Segawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 676 days.

(21) Appl. No.: 12/232,257

(22) Filed: Sep. 12, 2008

(65) Prior Publication Data

US 2009/0077659 A1 Mar. 19, 2009

(30) Foreign Application Priority Data

Sep. 13, 2007 (JP) ................................ 2007-238263

(51) Int. Cl.
  *G06F 21/00* (2006.01)
(52) U.S. Cl. ..................... 726/21; 726/3; 726/4; 726/10; 726/17; 726/18; 726/19; 726/27; 726/28; 726/29; 358/1.15
(58) Field of Classification Search .................. 713/201; 726/3, 4, 10, 17, 18, 19, 21, 27–29; 358/1.15
  See application file for complete search history.

(56) References Cited

U.S. PATENT DOCUMENTS

| | | | |
|---|---|---|---|
| 6,023,765 A * | 2/2000 | Kuhn ................................ | 726/4 |
| 7,568,217 B1 * | 7/2009 | Prasad et al. ........................ | 726/3 |
| 2005/0172151 A1 * | 8/2005 | Kodimer et al. ............. | 713/201 |
| 2007/0226808 A1 * | 9/2007 | Uchikawa ........................ | 726/27 |
| 2008/0104244 A1 * | 5/2008 | Chen et al. .................... | 709/226 |
| 2008/0307505 A1 * | 12/2008 | Persaud-Deolall et al. ...... | 726/4 |

FOREIGN PATENT DOCUMENTS

| | | |
|---|---|---|
| JP | 09/069079 | 3/1997 |
| JP | 3545573 | 2/1999 |
| JP | 2001/312495 | 9/2001 |
| JP | 2001/312495 | 11/2001 |
| JP | 2002/330150 | 11/2002 |
| JP | 2003/067506 | 3/2003 |
| JP | 3545573 | 7/2004 |
| JP | 2005-266699 | 9/2005 |

(Continued)

OTHER PUBLICATIONS

Kuo et al., "Dynamically Authorized Role-Based Access Control for Secure Distributed Computaion", 2002, XMLSEC '02 Proceedings of the 2002 ACM worksop on XML Securit, pp. 97-103.*

(Continued)

*Primary Examiner* — Jeffrey Pwu
*Assistant Examiner* — Hee Song
(74) *Attorney, Agent, or Firm* — Harness, Dickey & Pierce, P.L.C.

(57) ABSTRACT

An image processing apparatus, a session managing method, and a session managing program allow an operator to change his or her role flexibly. The image processing apparatus comprises a session managing unit for managing information about an operator who is logged in as a session, and a role determination unit for determining a role of the operator. The session managing unit includes a login session unit that is generated upon login of the operator, and a subject unit that generates information indicating the operator, a group to which the operator belongs, and an existing role of the operator. Upon request for a role change from the operator, the login session unit requests initialization of the subject unit. The subject unit then generates information indicating a role after role change based on the role after role change that is confirmed by the role determination unit.

8 Claims, 29 Drawing Sheets

FOREIGN PATENT DOCUMENTS

| | | |
|---|---|---|
| JP | 2005/283526 | 10/2005 |
| JP | 2006/012044 | 1/2006 |
| JP | 2006/119719 | 5/2006 |
| JP | 2006/135470 | 5/2006 |
| JP | 2004/167958 | 6/2006 |
| JP | 2006/167958 | 6/2006 |
| JP | 2006/195755 | 7/2006 |
| JP | 2006-195775 | 7/2006 |
| JP | 2006/217350 | 8/2006 |
| JP | 2006/221506 | 8/2006 |
| JP | 2006/235757 | 8/2006 |
| JP | 2006/235757 | 9/2006 |
| JP | 2006/293742 | 9/2006 |
| JP | 2006/293742 | 10/2006 |
| JP | 2006/350526 | 10/2006 |
| JP | 2006/350526 | 12/2006 |
| JP | 2007/080024 | 12/2006 |
| JP | 2007/080024 | 3/2007 |
| JP | 20007/088945 | 3/2007 |
| JP | 09/069079 | 4/2007 |
| JP | 2007/094615 | 4/2007 |
| JP | 20007/088945 | 4/2007 |
| WO | WO 2005/010702 | 2/2005 |

OTHER PUBLICATIONS

Ferraiolo et al., "A role-based access control model and reference implementation within a corporate intranet", Journal ACM Transactions on Information and System Security (TISSEC)—Special issue on role-based access control vol. 2 Issue 1, Feb. 199, pp. 1-30.*
English language Abstract 11-031132 dated Feb. 2, 1999.

* cited by examiner

FIG.5

| SOURCE PRINCIPAL | ROLE |
|---|---|
| USER: TAKEDA | DEVICE ADMINISTRATOR |
| USER: KITAHARA | DEVICE ADMINISTRATOR |
| GROUP: ACCOUNTS | USER ADMINISTRATOR |
| GROUP: PERSONNEL | USER ADMINISTRATOR |
| GROUP: SYSTEM ADMINISTRATION | DEVICE AND NETWORK ADMINISTRATOR |
| GROUP: ALL USERS | GENERAL USER |

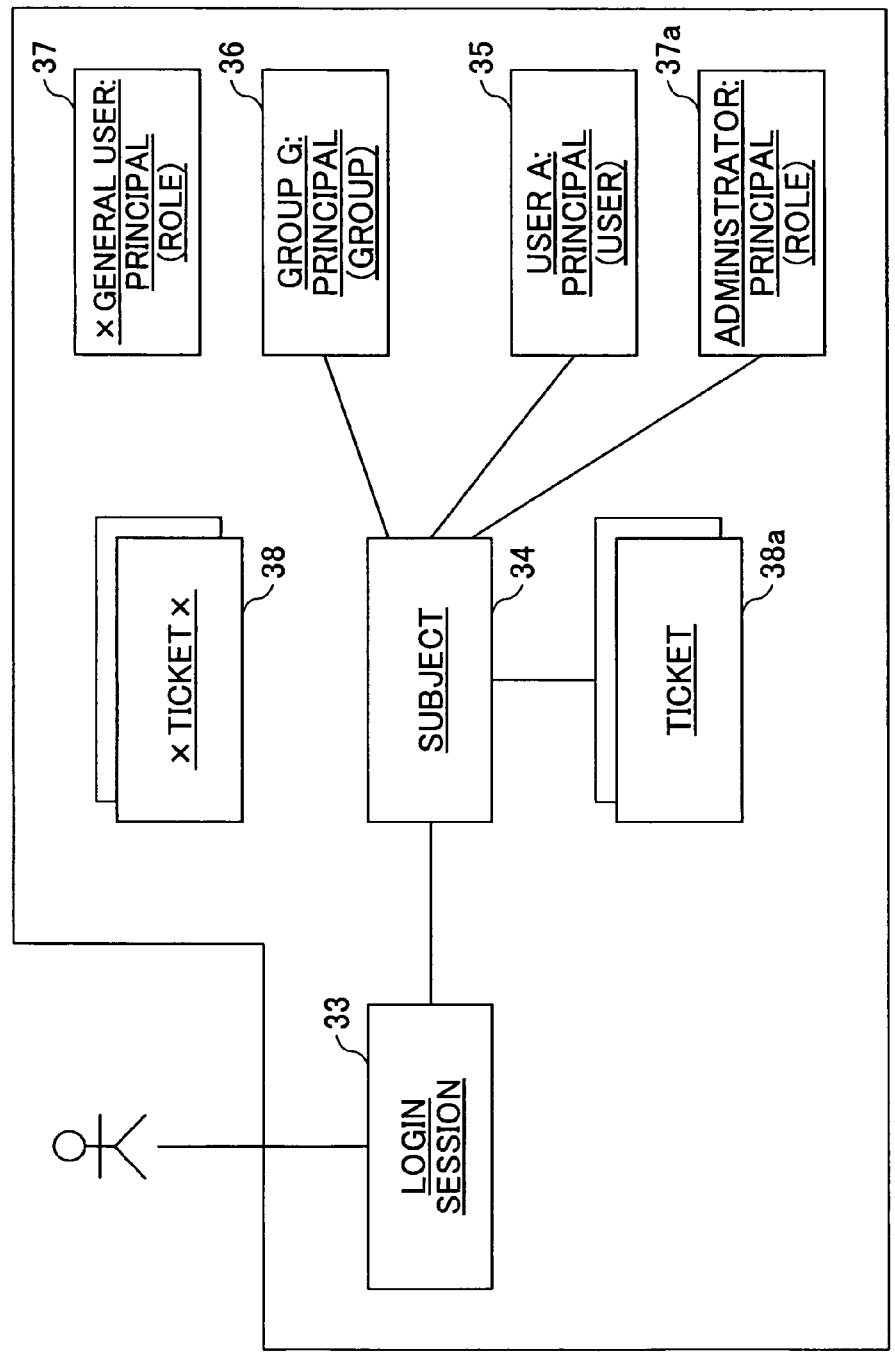

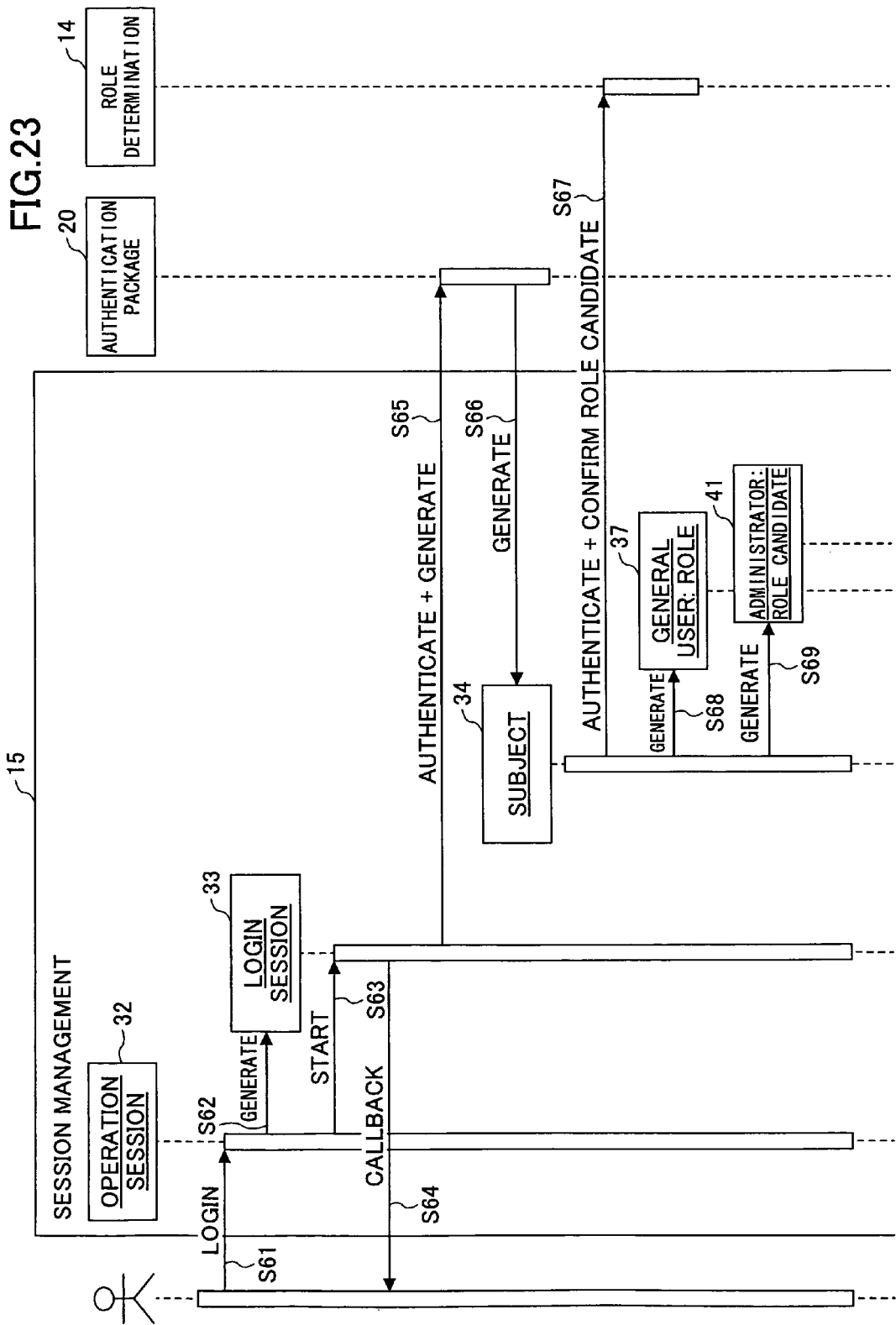

FIG.24

| SOURCE PRINCIPAL | ROLE | OBLIGATION |
|---|---|---|
| USER: TAKEDA | DEVICE ADMINISTRATOR | NONE |
| USER: KITAHARA | DEVICE ADMINISTRATOR | DEVICE LOCAL AUTHENTICATION (LOGIN VIA ACCOUNT WITH DEVICE ADMINISTRATOR AUTHORIZATION) |
| USER: DEVICE ADMINISTRATOR | DEVICE ADMINISTRATOR | NONE |
| GROUP: ACCOUNTS | USER ADMINISTRATOR | PKI AUTHENTICATION BY IC CARD |
| GROUP: PERSONNEL | USER ADMINISTRATOR | NONE |
| GROUP: SYSTEM ADMINISTRATION | DEVICE AND NETWORK ADMINISTRATOR | AUTHENTICATION BY KEY COMBINATION |
| GROUP: ALL USERS | GENERAL USER | NONE |

IMAGE PROCESSING APPARATUS, SESSION MANAGING METHOD AND SESSION MANAGING PROGRAM

BACKGROUND OF THE INVENTION

1. Field of the Invention

The present invention generally relates to image processing apparatuses, session managing methods, and session managing programs. Particularly, the invention relates to image processing apparatuses, session managing methods, and session managing programs in which operator privileges are managed based on the role of the operator.

2. Description of the Related Art

In a multifunction peripheral as an example of an image processing apparatus, the period between login and logout of an operator is managed in terms of a session. In such a multifunction peripheral, authentication is performed on a session by session basis. Authentication involves confirmation of the role of the operator as general administrator, user administrator, etc., based on factors such as user name or group.

In the multifunction peripheral, an operation by the operator who is logged in is allowed or prohibited in accordance with the operator's confirmed role. For example, an operation permitted exclusively to a user administrator is only allowed within a login session in which the user is authenticated as having the role as user administrator, and prohibited in a login session in which the user is authenticated as having the role as general administrator. Such management of operator privileges based on the role of the authenticated operator is described in Japanese Laid-Open Patent Applications No. 2005-266699 and 2006-195755.

In connection with the multifunction peripheral, an operator may have multiple roles as a general user, a general administrator, and so on. In such a case, when the operator, having logged in as general user to perform an operation allowed to a general user, wishes to perform an operation granted to a general administrator, he needs to once log out and then log in again as general administrator.

Thus, there has been the need to equip the conventional multifunction peripheral with functionality to allow an operator who is logged in to change his role, such as from general administrator to user administrator, by a simple operation.

However, conventional multifunction peripherals are constrained by inflexible security policy, which spells basic provisions on information security. For example, in a conventional multifunction peripheral, an operation for role change is required to follow the security policy.

SUMMARY OF THE INVENTION

Thus, it is a general object of the present invention to provide an image processing apparatus, a session managing method, and a session managing program in which the aforementioned problems are eliminated. A more specific object is to provide an image processing apparatus, a session managing method, and a session managing program in which the role of an operator can be changed in a flexible manner.

In one aspect, the invention provides an image processing apparatus comprising at least one of a plotter unit and a scanner unit, in which an operation is allowed or prohibited depending on a role of an operator who is logged in. The image processing apparatus comprises a session managing unit configured to manage information about the operator who is logged in between a login and a logout of the operator as a session; a role determination unit configured to determine a role of the operator based on a request from the session managing unit; and an authentication unit configured to authenticate the operator based on a request from the session managing unit. The session managing unit comprises a login session unit generated by the login of the operator and configured to request authentication of the operator from the authentication unit; and a subject unit generated by the authentication unit based on a result of the authentication and configured to generate information indicating the operator, a group to which the operator belongs, and an existing role of the operator, based on the role of the operator determined by the role determination unit. The login session unit, based on a request from the operator for a role change, requests initialization of the subject unit due to role change. The subject unit generates information indicating a role after role change, based on the role of the operator after role change that is confirmed by the determination unit.

In another aspect, the invention provides a session managing method for allowing or prohibiting an operation by an operator who is logged in in an image processing apparatus which comprises at least one of a plotter unit and a scanner unit depending on a role of the operator. The method comprises a session managing step of managing information about the operator who is logged in between a login and a logout of the operator as a session; a role determination step of determining a role of the operator; and an authenticating step of authenticating the operator. The session managing step comprises the steps of a login session unit, which is generated upon login of the operator, requesting authentication of the operator; a subject unit, which is generated based on a result of the authentication, generating information indicating the operator, a group to which the operator belongs, and an existing role of the operator, based on the role of the operator determined in the role determination step; the login session unit requesting initialization of the subject unit due to role change based on a request for a role change from the operator; and the subject unit generating information indicating a role after role change, based on the role of the operator after role change that is confirmed in the role determination step.

In another aspect, the invention provides a computer readable program for allowing or prohibiting an operation by an operator who is logged in in an image processing apparatus comprising at least one of a plotter unit and a scanner unit depending on a role of the operator.

The program, when executed by one or more processors of the image processing apparatus, causes the one or more processors to function as a session managing unit configured to manage information about the operator who is logged in between a login and a logout of the operator as a session; a role determination unit configured to determine a role of the operator based on a request from the session managing unit; and an authentication unit configured to authenticate the operator based on a request from the session managing unit.

The program further causes the session managing unit to function as a login session unit, which is generated upon login of the operator, the login session unit requesting authentication of the operator from the authentication unit; and a subject unit, which is generated by the authentication unit based on a result of the authentication, the subject unit generating information about the operator, a group to which the operator belongs, and an existing role of the operator, based on the role of the operator that is confirmed by the role determination unit.

The login session unit requests initialization of the subject unit due to role change based on a request from the operator for a role change. The subject unit generates information indicating a role after role change based on the role of the operator after role change that is confirmed by the role determination unit.

The present invention may also be embodied in various other methods, apparatuses, systems, computer programs, recording media, or data structures having one of more constituent elements or combinations thereof of the present invention.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 5 shows an example of a role management table;

FIG. 13B shows an object diagram of the multifunction peripheral after role change;

FIG. 23 shows a sequence chart of a process sequence in a session management mechanism;

FIG. 24 shows another example of a role management table;

DETAILED DESCRIPTION OF THE PREFERRED EMBODIMENTS

In the following, embodiments of the present invention are described with reference to the drawings. While the following description is made with reference to a multifunction peripheral (MFP) as an example of an image processing apparatus, the present invention may be embodied in any image processing apparatus in which operator privileges are managed on the basis of the operator's role.

Figure 1:
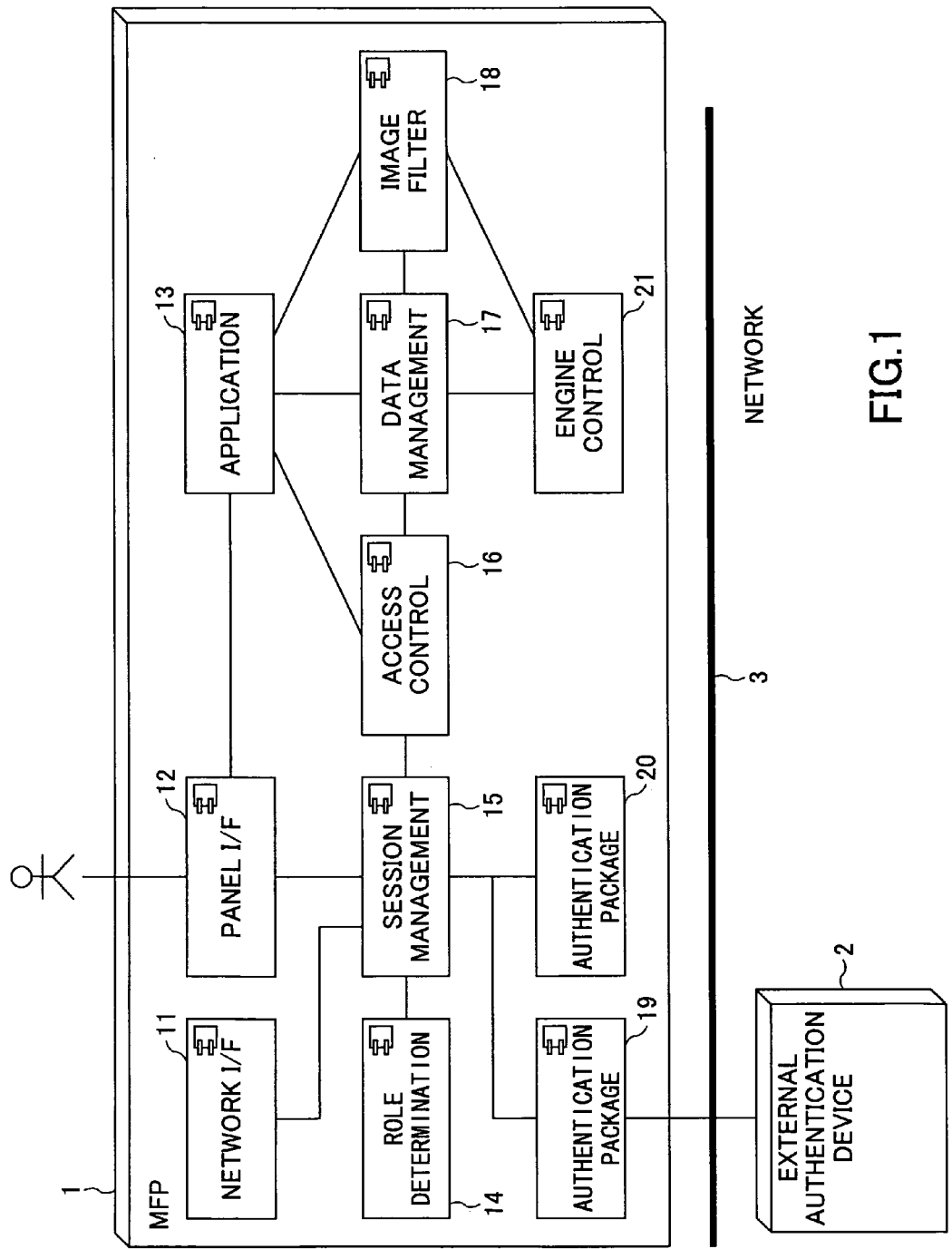
FIG. 1 shows a software structure of a multifunction peripheral according to an embodiment of the invention.

FIG. 1 shows a software structure of a multifunction peripheral 1 according to an embodiment of the invention. The multifunction peripheral 1 includes a network interface ("I/F") 11, a panel I/F 12, an application 13, a role determination unit 14, a session managing unit 15, an access control unit 16, a data managing unit 17, an image filter 18, authentication packages 19 and 20, and an engine control unit 21. The authentication package 19 utilizes an external authentication apparatus 2 via network 3 for external authentication.

The network I/F 11 provides an interface with the network 3. The panel I/F 12 provides an interface with an operator. The application 13 is software designed for a specific purpose. The role determination unit 14 determines the role of an operator who logs in based on his user name or group as main factors. The session managing unit 15 manages a period between login and logout of the operator in terms of a session. The session managing unit 15 also manages the user name, group, and role of the operator who is logged in.

The access control unit 16 may control access from the application 13 to the session managing unit 15. The data managing unit 17 manages data utilized in the multifunction peripheral 1. The image filter 18 performs a predetermined process on an image outputted to a plotter unit (not shown), or inputted from a scanner unit (not shown). The engine control unit 21 controls various engines included in the multifunction peripheral 1, such as a plotter engine or a scanner engine.

The session managing unit 15 has a function allowing an operator who is logged in to change his role. Such a session management mechanism by the session managing unit 15 is suitable for built-in devices with a simple input unit (such as an operating panel) for the operator, and can be utilized regardless of a login unit.

In the multifunction peripheral 1 according to embodiments of the invention, "possible roles" of an operator are managed implicitly or explicitly using a role mechanism on the basis of user name or group as main factors, as described below. Thus the role of the same operator can be changed in a flexible manner.

Embodiment 1

Figure 2:
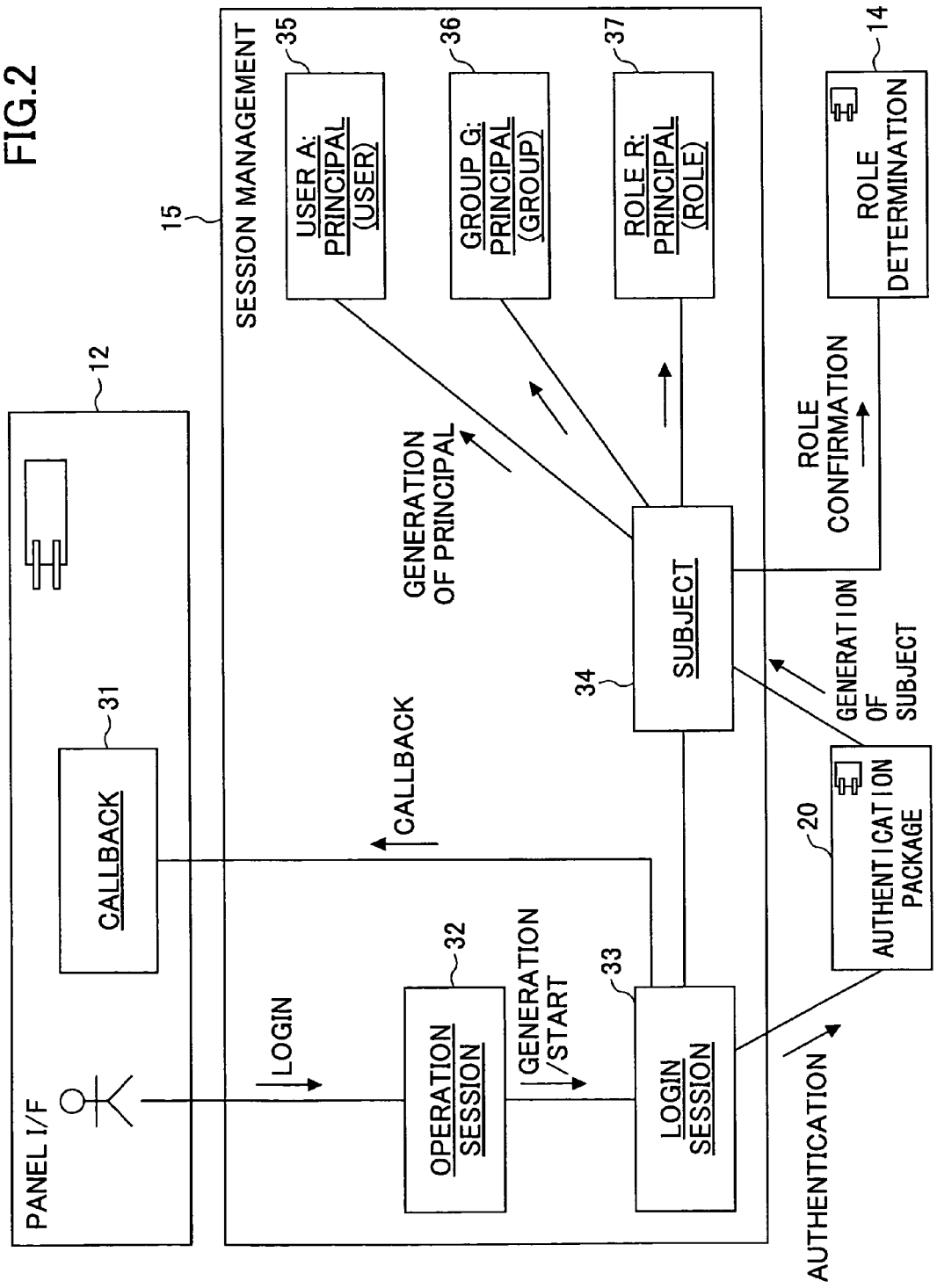
FIG. 2 shows a collaboration diagram of a session management mechanism.
Figure 3:
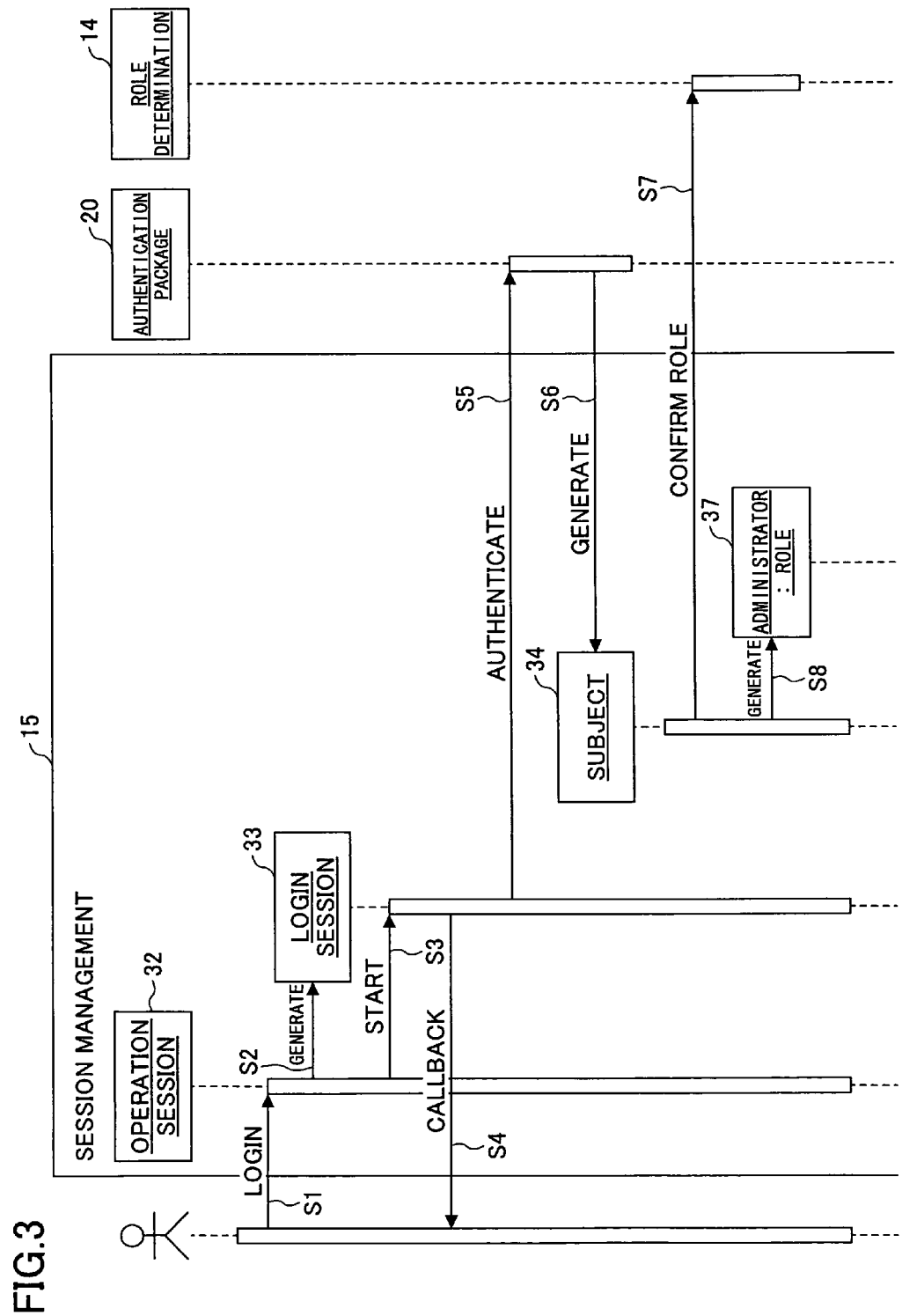
FIG. 3 shows a sequence chart of a process sequence in the session management mechanism.

FIG. 2 shows a collaboration diagram of a session management mechanism. FIG. 3 shows a sequence chart illustrating a process sequence of the session management mechanism. As shown in FIG. 2, the panel I/F 12 includes a callback 31 as an object. The session managing unit 15 includes an operation session 32, a login session 33, a subject 34, and principals 35 to 37 as objects.

An operator designates a role (to be hereafter referred to as a "role list") via the panel I/F 12, and enters an ID and a password to log in. In step S1, the operation session 32 of the session managing unit 15 receives the operator's login. In step S2, the operation session 32 generates the login session 33.

In step S3, the operation session 32 requests the login session 33 to start authentication. In step S4, the login session 33 requests from the callback 31 the role list designated by the operator and the ID and password entered as authentication information by the operator, thereby acquiring the designated role list, the ID, and the password.

In step S5, the login session 33 requests authentication from the authentication package 20, using the ID and the password acquired in step S4. Upon successful authentication, the authentication package 20 in step S6 generates the subject 34 and provides a user name and a group associated with the ID and the password to the subject 34 as an authentication response. The subject 34 generates principals other than that for the role, i.e., the principals 35 and 36.

In step S7, the subject 34, using the designated role list acquired in step S4 and the user name or group supplied from the authentication package 20 in step S6, requests role confirmation from the role determination unit 14. The role determination unit 14, using a role management table to be described later, conducts role confirmation based on whether the role list designated by the operator corresponds to the user name or group supplied by the subject 34, and notifies the subject 34 of a role confirmation result. When the role confirmation result is successful, the subject 34 in step S8 generates the principal 37 for the role corresponding to the designated role list, thereby beginning a session.

Figure 4:
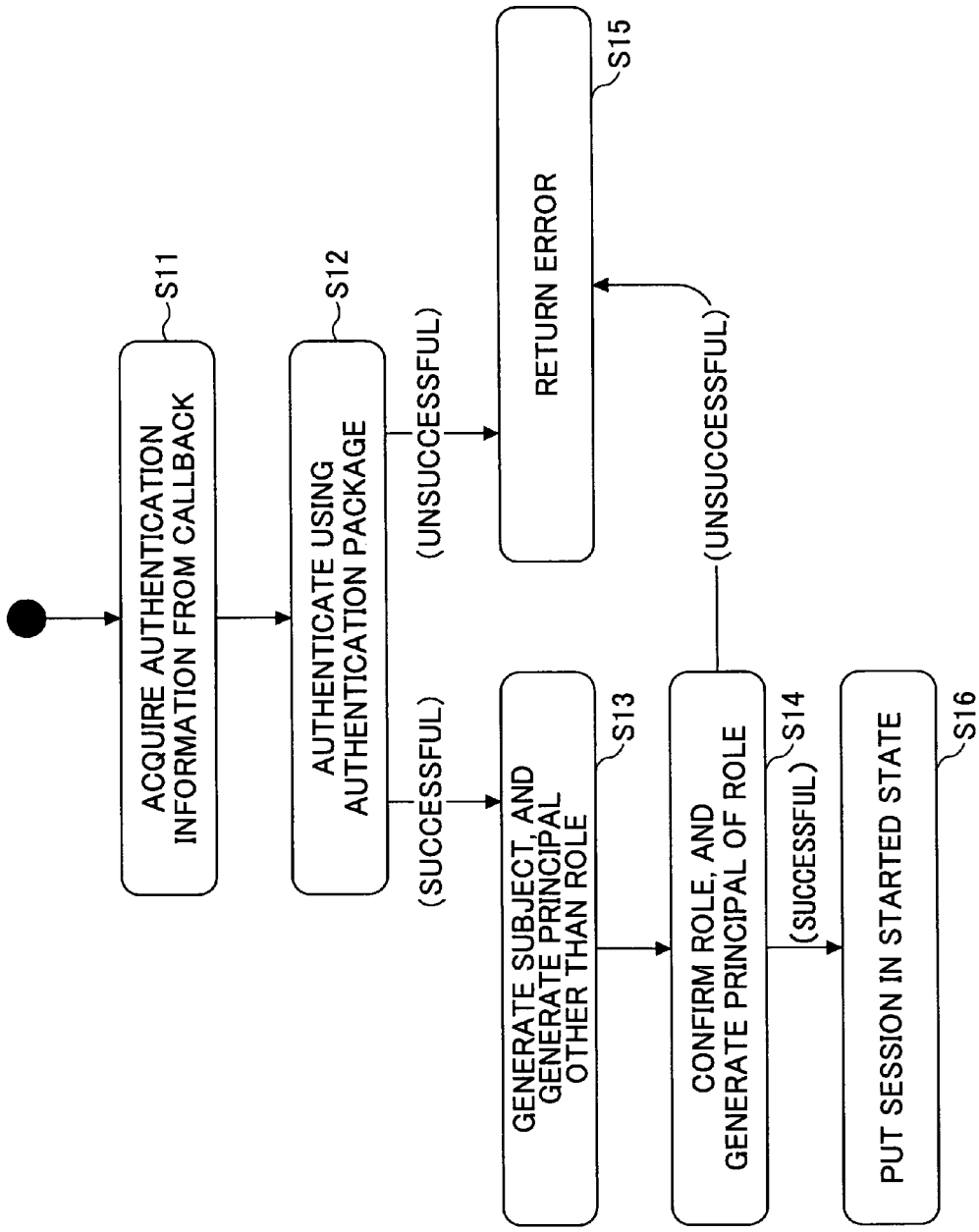
FIG. 4 shows a flowchart of a session start process.

FIG. 4 shows a flowchart of a session start sequence. In step S11, the login session 33 acquires from the callback 31 of the panel I/F 12 the role list designated by the operator and the authentication information entered by the operator. In step S12, the login session 33, using the acquired authentication information, conducts authentication in the authentication package 20.

Upon successful authentication, the authentication package 20 in step S13 generates the subject 34 and supplies the user name or group associated with the authentication information to the subject 34 as an authentication response. The subject 34 generates principals other than that for the role, i.e., the principals 35 and 36.

In step S14, the subject 34, using the role list designated by the operator and the user name or group supplied by the authentication package 20, requests role confirmation from the role determination unit 14, thereby confirming the role. When the role confirmation result is successful, the subject 34 generates the principal 37 for the role. In step S16, the subject 34 begins a session. Upon unsuccessful authentication in step S12, or unsuccessful role confirmation result in step S14, the subject 34 returns an error to the operator.

FIG. 5 shows an example of a role management table. The role management table associates a source principal, which represents a user name or a group, with a role. In the role management table of FIG. 5, a user name "Takeda" is associated with a role "Device administrator". A group "Accounts" is associated with a role "User administrator".

Figure 6:
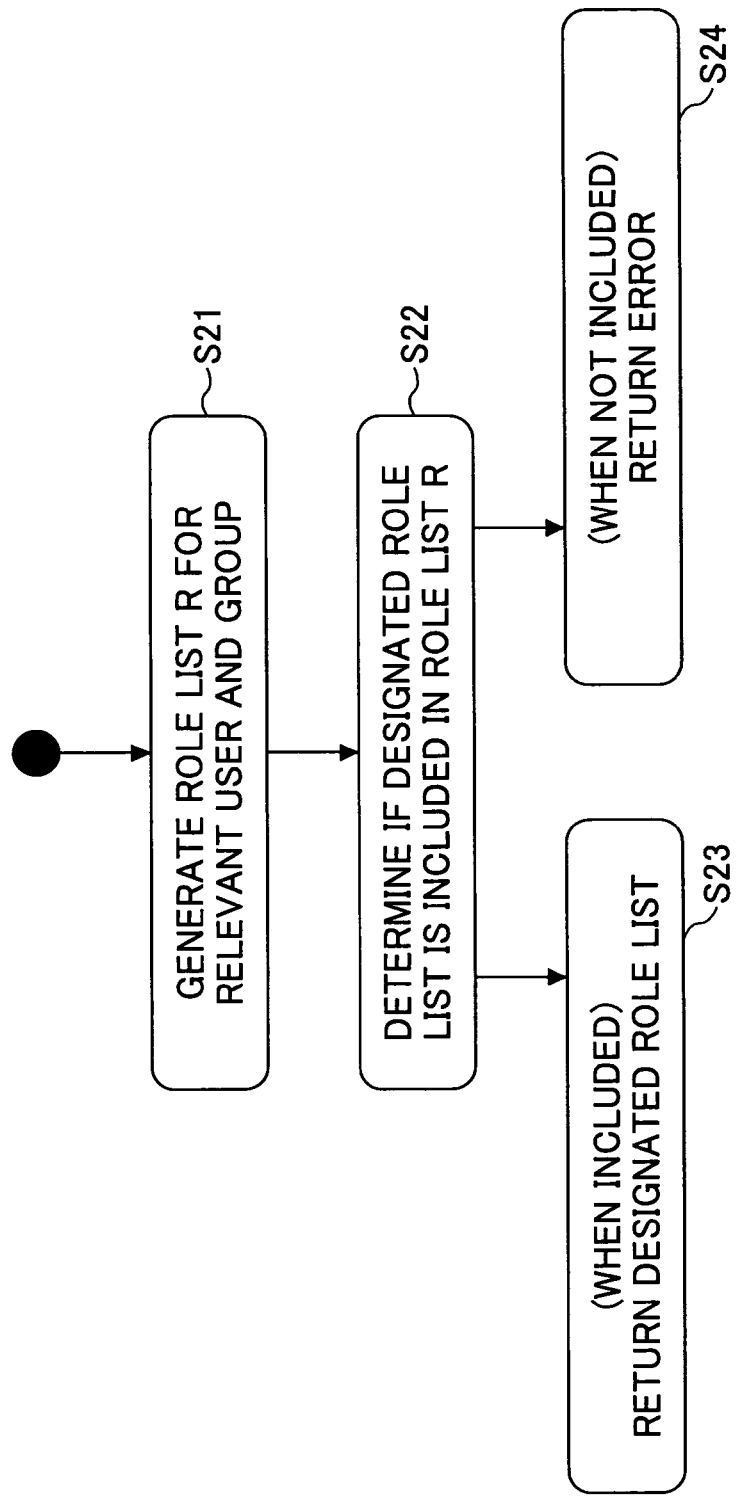
FIG. 6 shows a flowchart of a role confirmation process in a role determination unit.

FIG. 6 shows a flowchart of a role confirmation process in the role determination unit 14. In step S21, the role determination unit 14, using the role management table, generates a role list R corresponding to the user name or group supplied from the subject 34. In step S22, the role determination unit 14 determines whether the role list designated by the operator is included in the role list R generated in step S21.

When the role list designated by the operator is included in the role list R generated in step S21, the role determination unit 14, assuming that the role confirmation result is successful, returns the designated role list to the operator. When the role list designated by the operator is not included in the role list R generated in step S21, the role determination unit 14, assuming that the role confirmation result is unsuccessful, returns an error to the operator.

In accordance with the session management mechanism of the present embodiment, privilege confirmation is conducted by using a ticket. Generation of a ticket and the mechanism of privilege confirmation are described below.

Figure 7:
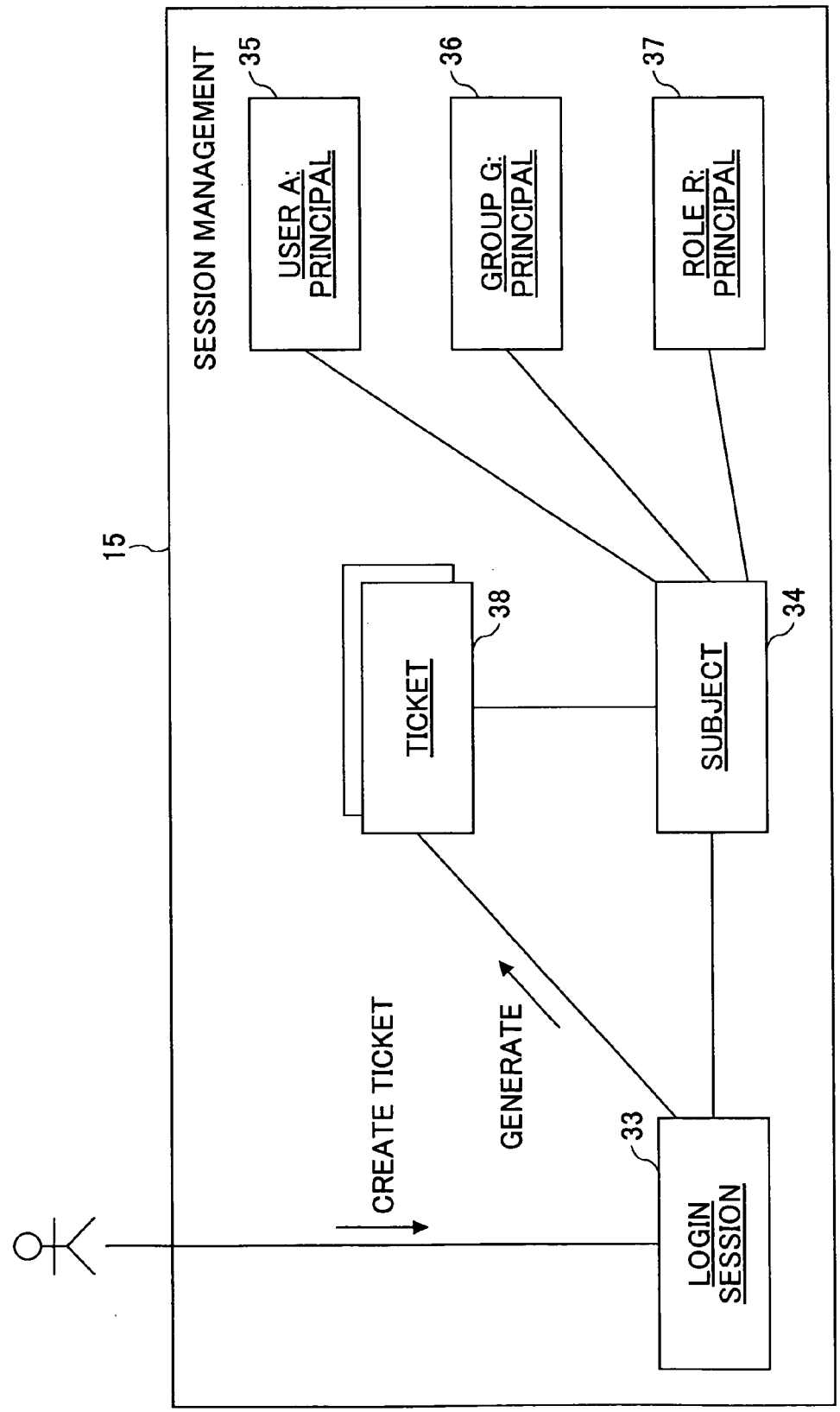
FIG. 7 shows a collaboration diagram illustrating an outline of a ticket generating process.

FIG. 7 shows a collaboration diagram of a process of generating a ticket. As an operator requests generation of a ticket via the panel I/F 12, the login session 33 of the session managing unit 15 generates a ticket 38 in association with the subject 34. The ticket 38 includes information for association with the subject 34. The ticket 38 is utilized by being circulated within the multifunction peripheral 1.

Figure 8:
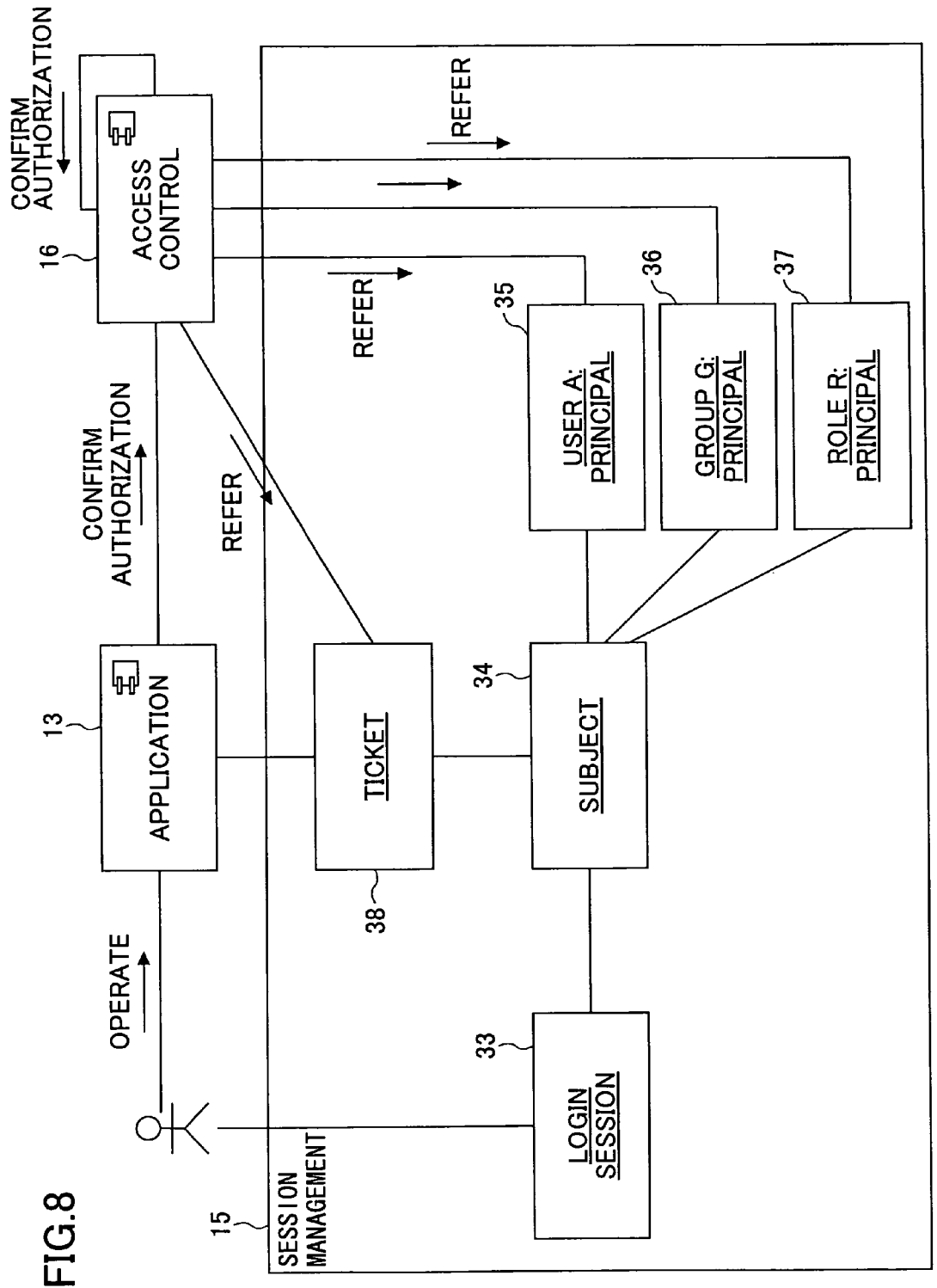
FIG. 8 shows a collaboration diagram illustrating a privilege confirmation mechanism.
Figure 9:
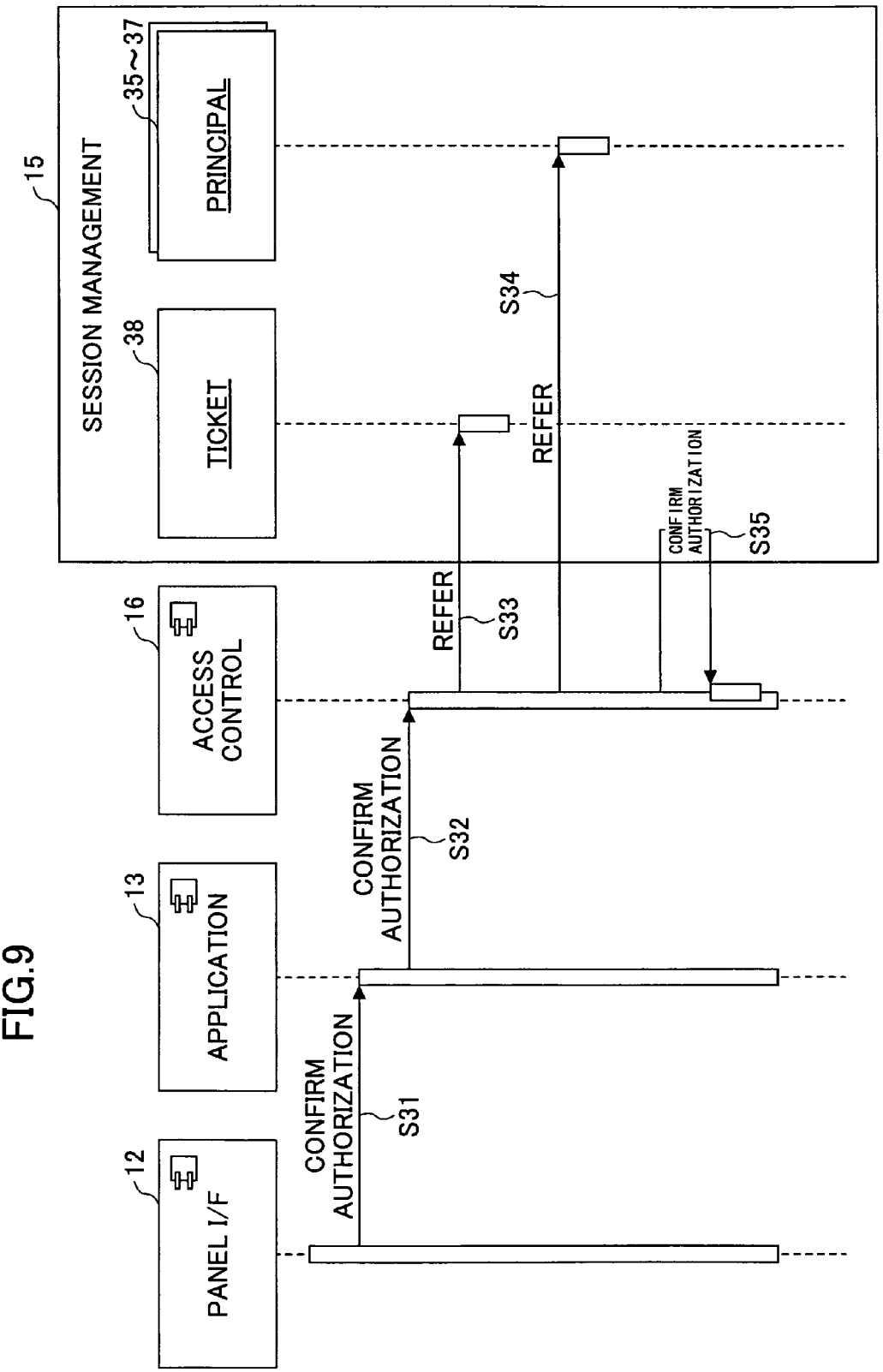
FIG. 9 shows a sequence chart of a privilege confirmation process sequence.

FIG. 8 shows a collaboration diagram illustrating the mechanism of privilege confirmation. FIG. 9 shows a sequence chart of a privilege confirmation process. An operator operates the panel I/F 12 and requests privilege confirmation. The panel I/F 12, upon receiving the privilege confirmation request from the operator, requests the application 13 to conduct privilege confirmation in step S31. In step S32, the application 13 designates the ticket 38 and requests the access control unit 16 to conduct privilege confirmation.

In step S33, the access control unit 16, by referring to the designated ticket 38, identifies the corresponding subject 34 and further identifies the principals 35 to 37. In step S34, the access control unit 16 refers to the principals 35 to 37. In step S35, the access control unit 16, based on the principals 35 to 37, can conduct privilege confirmation with regard to the operator.

Figure 10:
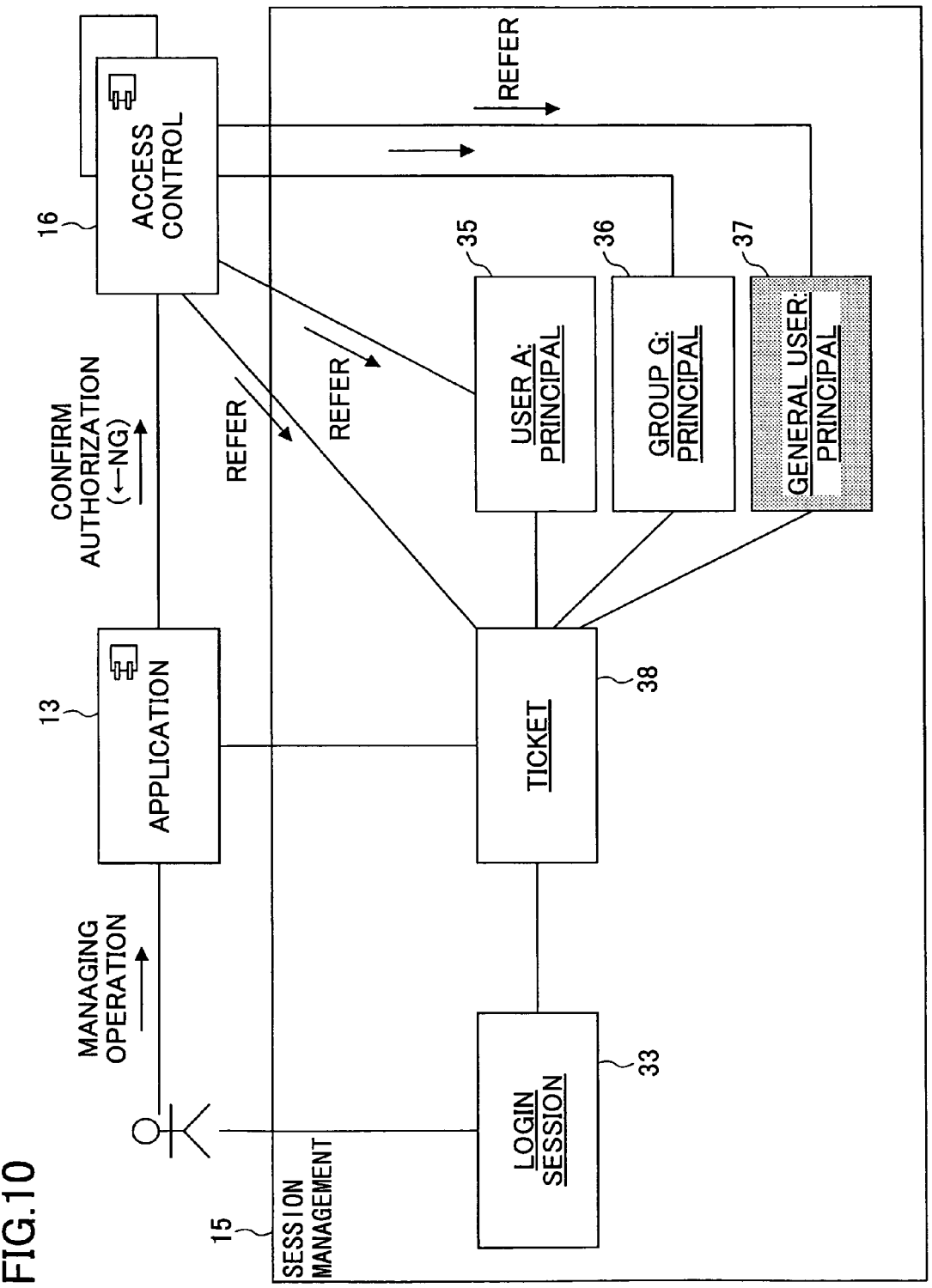
FIG. 10 shows a collaboration diagram for a privilege confirmation process in the absence of a privilege.

FIG. 10 shows a collaboration diagram of privilege confirmation in the absence of a relevant privilege. An operator operates the panel I/F 12 and requests confirmation of a privilege for a managing operation. Upon reception of the privilege confirmation request from the operator, the panel I/F 12 requests privilege confirmation for the managing operation from the application 13. The application 13 designates the ticket 38 and requests privilege confirmation for the managing operation from the access control unit 16.

The access control unit 16 refers to the designated ticket 38 and identifies the corresponding subject 34, and further identifies the principals 35 to 37. The access control unit 16 refers to the identified principals 35 to 37. Based on the principals 35 to 37, the access control unit 16 conducts privilege confirmation concerning the operator. In the present example, the role of the operator who logged in is general user. Thus, the access control unit 16 returns "NG" as a privilege confirmation result for the managing operation.

Figure 11:
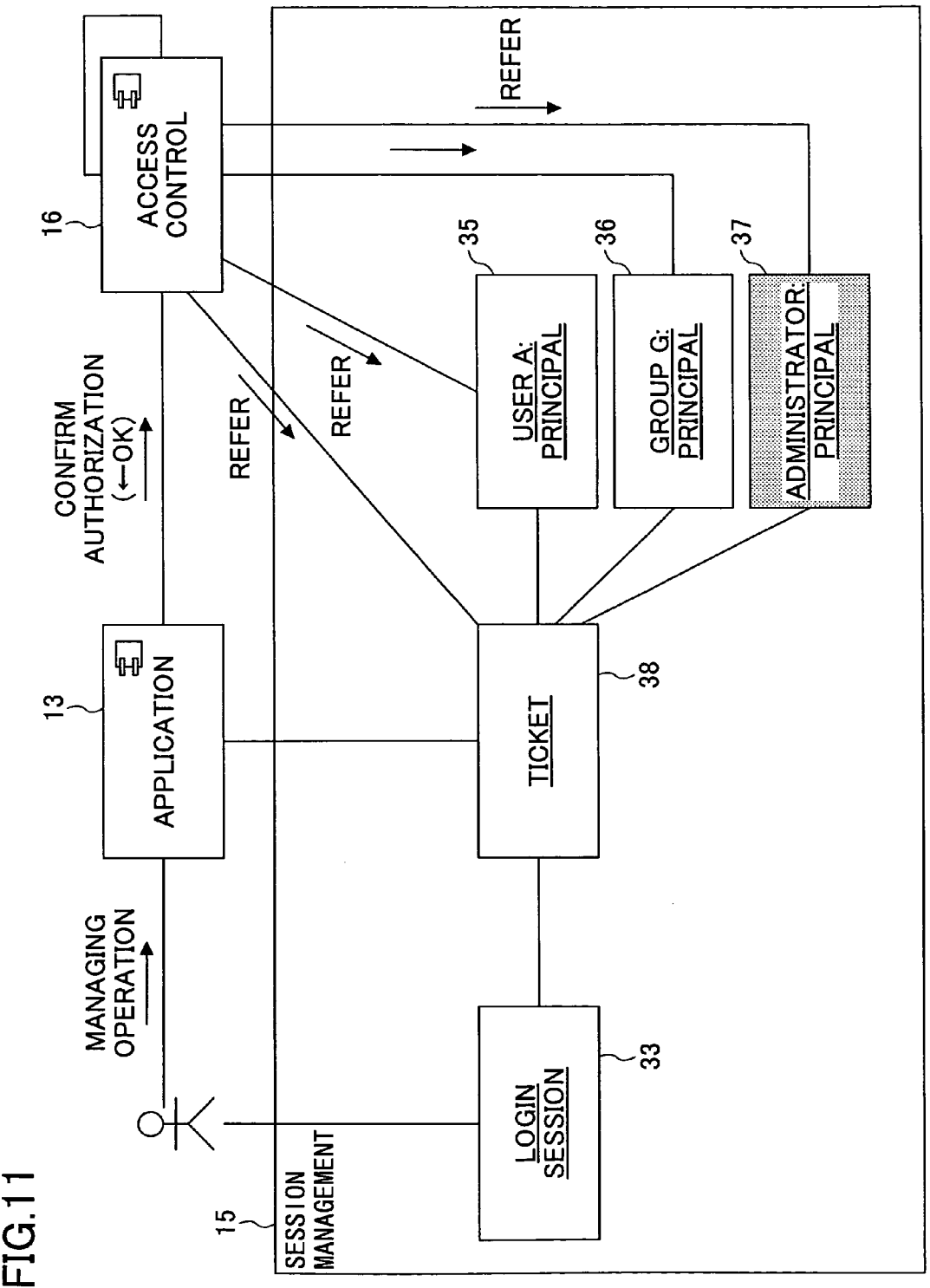
FIG. 11 shows a collaboration diagram for the privilege confirmation process in the presence of a privilege.

FIG. 11 shows a collaboration diagram of privilege confirmation in the presence of a relevant privilege. The operator operates the panel I/F 12 and requests privilege confirmation for a managing operation. The panel I/F 12, upon reception of the privilege confirmation request from the operator, requests privilege confirmation for the managing operation from the application 13. The application 13 designates the ticket 38 and requests privilege confirmation for the managing operation from the access control unit 16.

The access control unit 16 refers to the designated ticket 38 and identifies the corresponding subject 34 and the principals 35 to 37. The access control unit 16 refers to the identified principals 35 to 37, based on which it conducts privilege confirmation concerning the operator. In the present example, the role of the operator who logged in is administrator. Thus, the access control unit 16 returns "OK" as a privilege confirmation result for the managing operation.

Role Change

In accordance with the session management mechanism of the present embodiment, there is provided a function allowing the operator to change his role after he logged in. The mechanism of role change in the present embodiment is described below.

Figure 12:
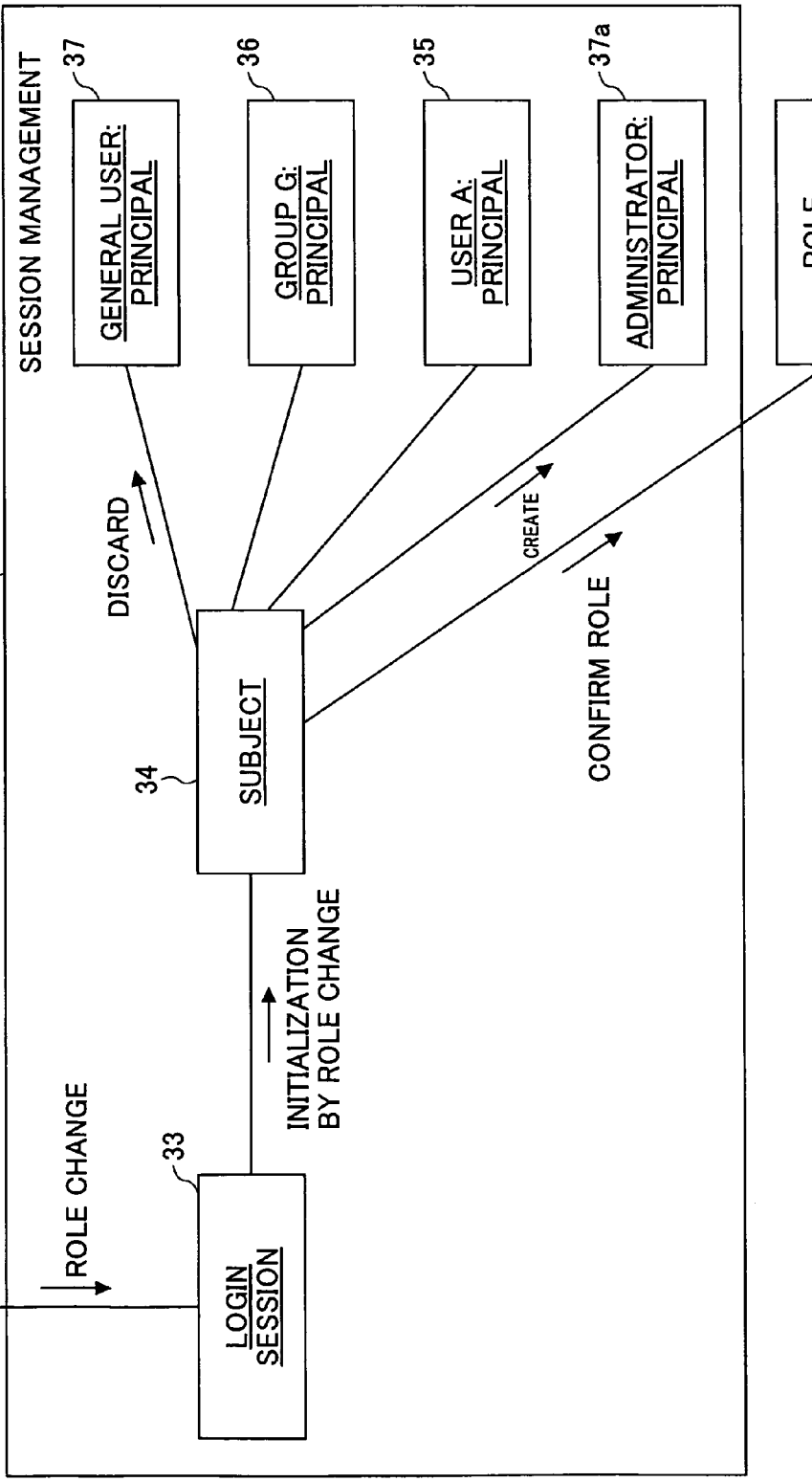
FIG. 12 shows a collaboration diagram illustrating a role change process.
Figure 13A:
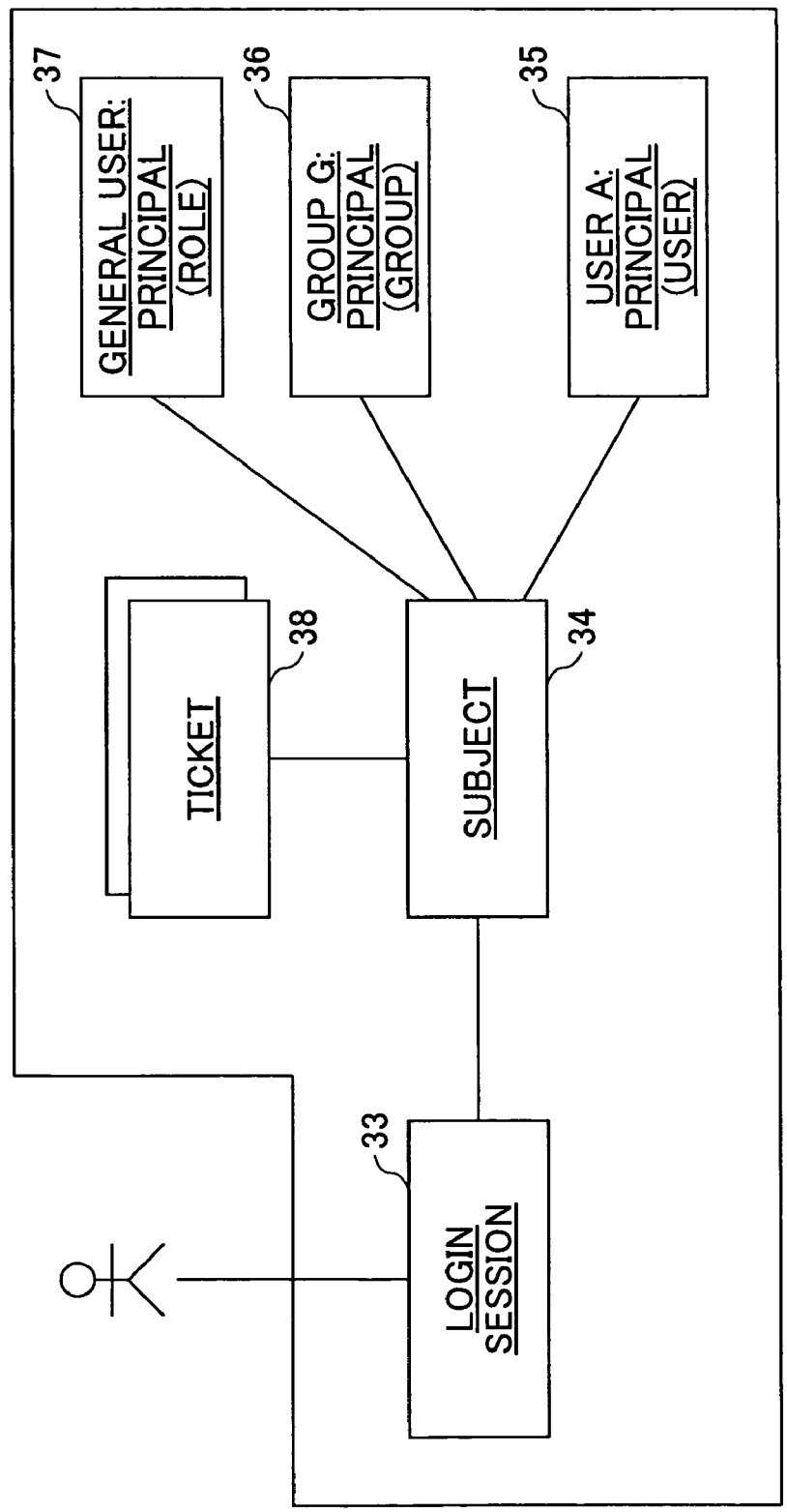
FIG. 13A shows an object diagram of a multifunction peripheral before role change.
Figure 14:
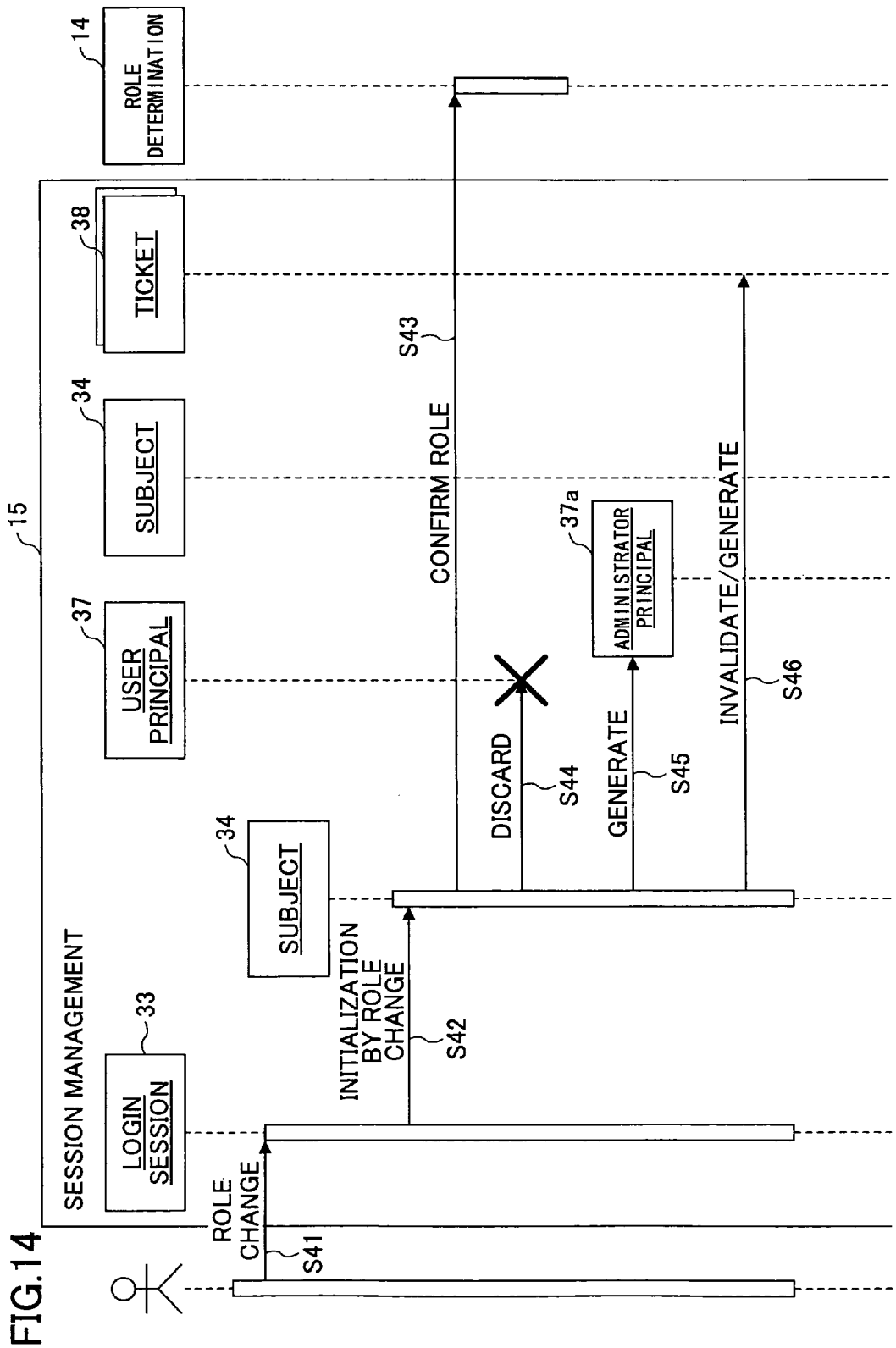
FIG. 14 shows a sequence chart for a role change process sequence.

FIG. 12 shows a collaboration diagram of a role change process. FIGS. 13A and 13B show object diagrams of a multifunction peripheral before and after, respectively, a role change. FIG. 14 shows a sequence chart of a role change process. An operator requests a role change via the panel I/F 12. In step S41, the login session 33 of the session managing unit 15 receives the role change request.

In step S42, the login session 33 requests the subject 34 to conduct initialization by role change. In step S43, the subject 34, using a role list indicating a changed role and the user name or group supplied from the authentication package 20 in step S6, requests role confirmation from the role determination unit 14.

The role determination unit 14, using the aforementioned role management table, conducts role confirmation based on whether the role list indicating the changed role corresponds to the user name or group supplied from the authentication package 20, and then notifies the subject 34 of a role confirmation result. When the role confirmation result is successful, the subject 34 in step S44 discards the principal 37 with the role prior to change.

In step S45, the subject 34 generates a principal 37a with the role in accordance with the role list indicating the changed role, and begins a session. In step S46, the ticket 38 that has been associated with the subject 34 is invalidated, and a new ticket 38a is generated.

The object diagram shown in FIG. 13A is prior to the request made by the operator via the panel I/F 12 for role change. The object diagram shown in FIG. 13B is after the request for role change.

As shown in FIG. 13B, after the operator requests the role change via the panel I/F 12, the login session 33 invalidates the ticket 38 associated with the subject 34, and generates the ticket 38a in association with the subject 34. The ticket 38a includes information concerning its association with the subject 34. The ticket 38a is utilized by being circulated within the multifunction peripheral 1.

Figure 15:
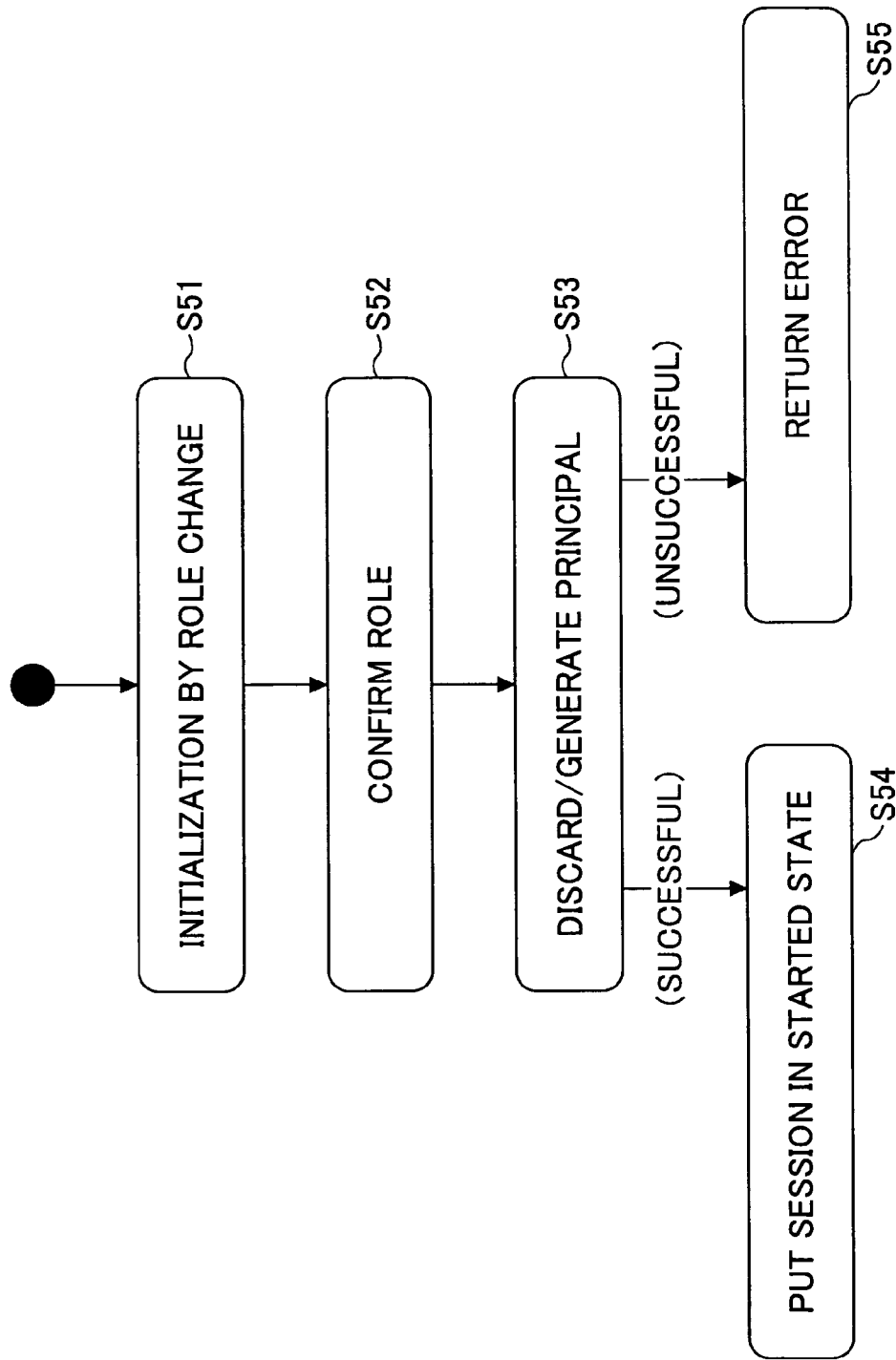
FIG. 15 shows a flowchart of a session start process upon role change.

FIG. 15 shows a flowchart of a session start sequence upon role change. In step S51, the login session 33 requests the subject 34 to conduct initialization by role change. In step S52, the subject 34, using the role list indicating the changed role, and the user name or group supplied from the authentication package 20 in step S6, requests role confirmation from the role determination unit 14.

The role determination unit 14, using the aforementioned role management table, determines whether the role list indicating the changed role is associated with the user name or group supplied from the authentication package 20, and then notifies the subject 34 of a role confirmation result. When the role confirmation result is successful, the subject 34 in step S53 discards the principal 37 with the role prior to change, generates the principal 37a of the role in accordance with the role list indicating the changed role, and begins a session in step S54. When the role confirmation result is unsuccessful, the subject 34 in step S55 returns an error to the operator.

Figure 16:
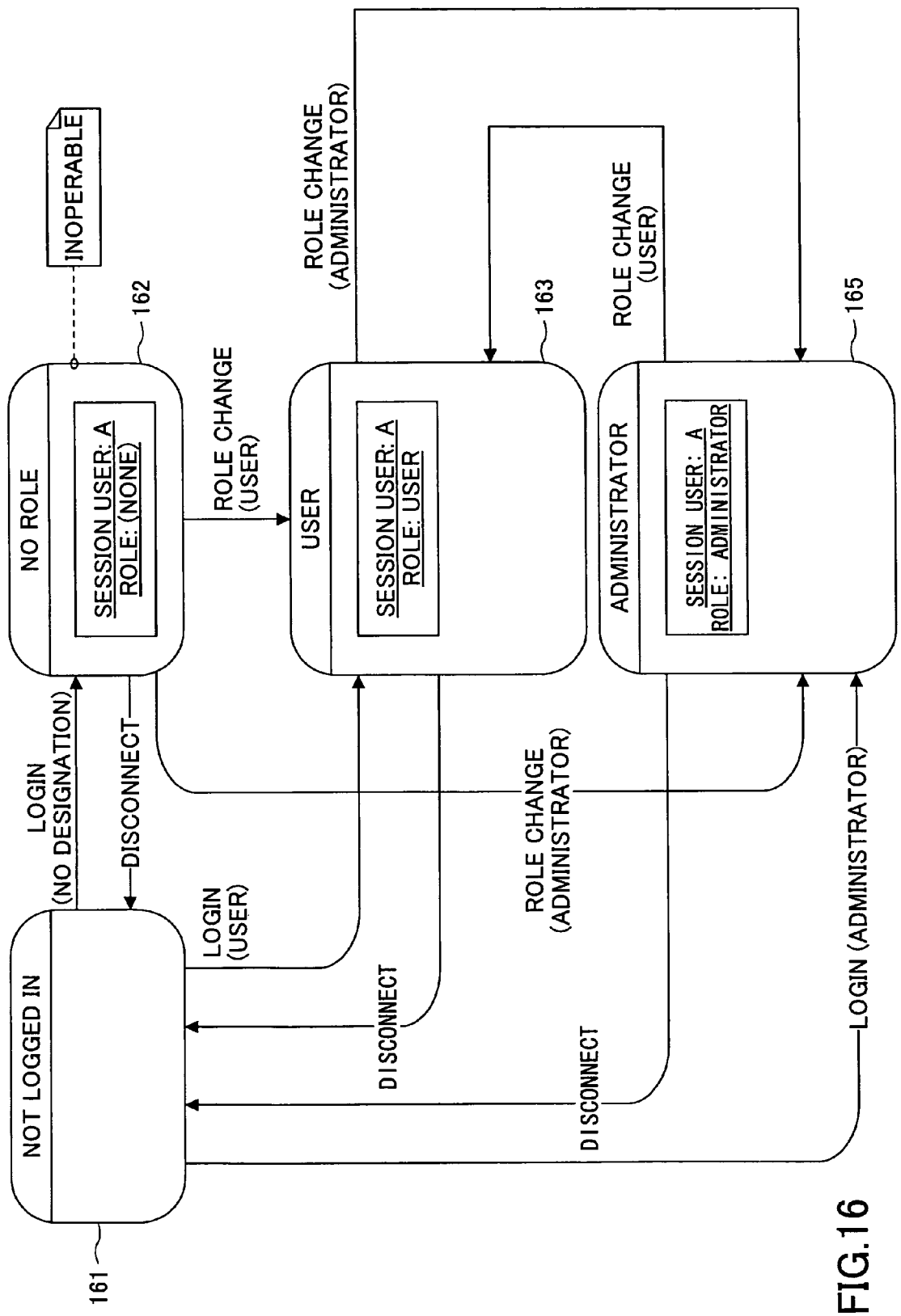
FIG. 16 shows a state transition diagram when an operator has roles as user and administrator.

FIG. 16 shows a state transition diagram of role. In this example, an operator has roles as user and administrator. A state 161 represents a state in which the operator is not logged in. In state 161, no role is designated. The state 161, upon login without a role designation, transitions to a state 162 that has no role and inoperable.

Upon login with a designation of the role "user", the state 161 transitions to a state 163 with the role "user". The state 163 manages a session for the role "user". The state 161, upon login with a designation of the role "administrator", transitions to a state 165 with the role "administrator". The state 165 manages a session for the role "administrator". The state 162, 163, or 165 transitions to the state 161 upon logout.

The state 162, upon role change with a designation of the role "user", transitions to the state 163 with the role "user". Upon role change with a designation of the role "administrator", the state 162 transitions to the state 165 with the role "administrator".

The state 163, upon role change with a designation of the role "administrator", transitions to the state 165 for the role "administrator". The state 165, upon role change with a designation of the role "user", transitions to the state 163 with the role "user".

The state 162 with no role is permitted because there are cases in which, after login, a user name or group becomes known and a role is decided on the basis of the user name or group. By taking such cases into consideration, a role is permitted to be acquired later in the multifunction peripheral 1 of the present embodiment.

Figure 17:
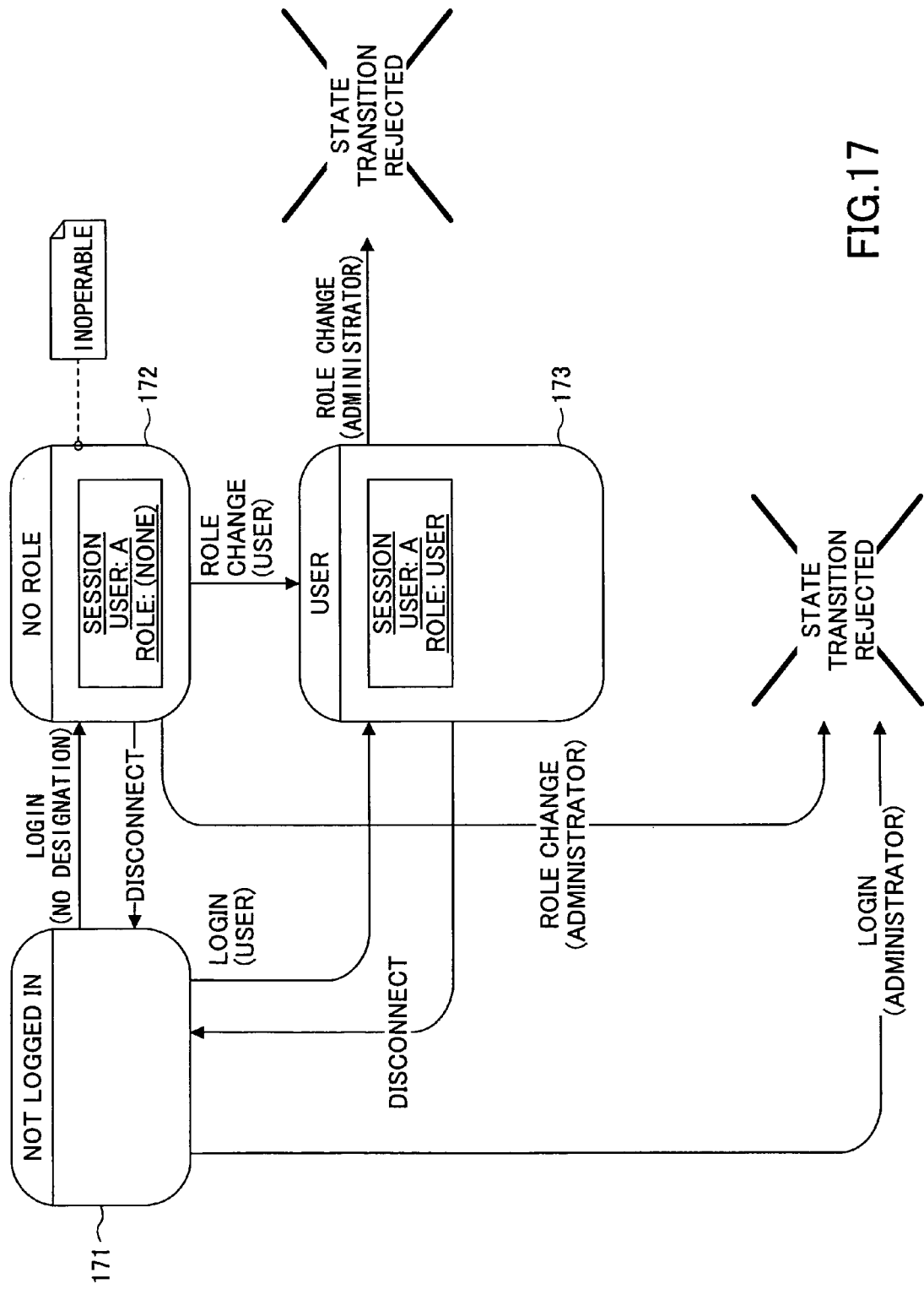
FIG. 17 shows a state transition diagram when an operator has a role as user.

FIG. 17 shows a state transition diagram for role. In this example, an operator has the role of user. A state 171 represents a state in which the operator is not logged in. The state 171, upon login without designating a role, transitions to a state 172 that has no role and is inoperable.

The state 171, upon login with a designation of the role "user", transitions to a state 173 with the role "user". The state 173 manages a session for the role "user". The state 171, upon login with a designation of the role "administrator", is rejected to transition to the state with the role "administrator". The state 172 or 173 transitions to the state 171 upon logout.

The state 172, upon role change with a designation of the role "user", transitions to the state 173 with the role "user". Upon role change with a designation of the role "administrator", the state 172 is rejected to transition to the state with the role "administrator". The state 173, upon role change with a designation of the role "administrator", is rejected to transition to the state with the role "administrator".

Figure 18:
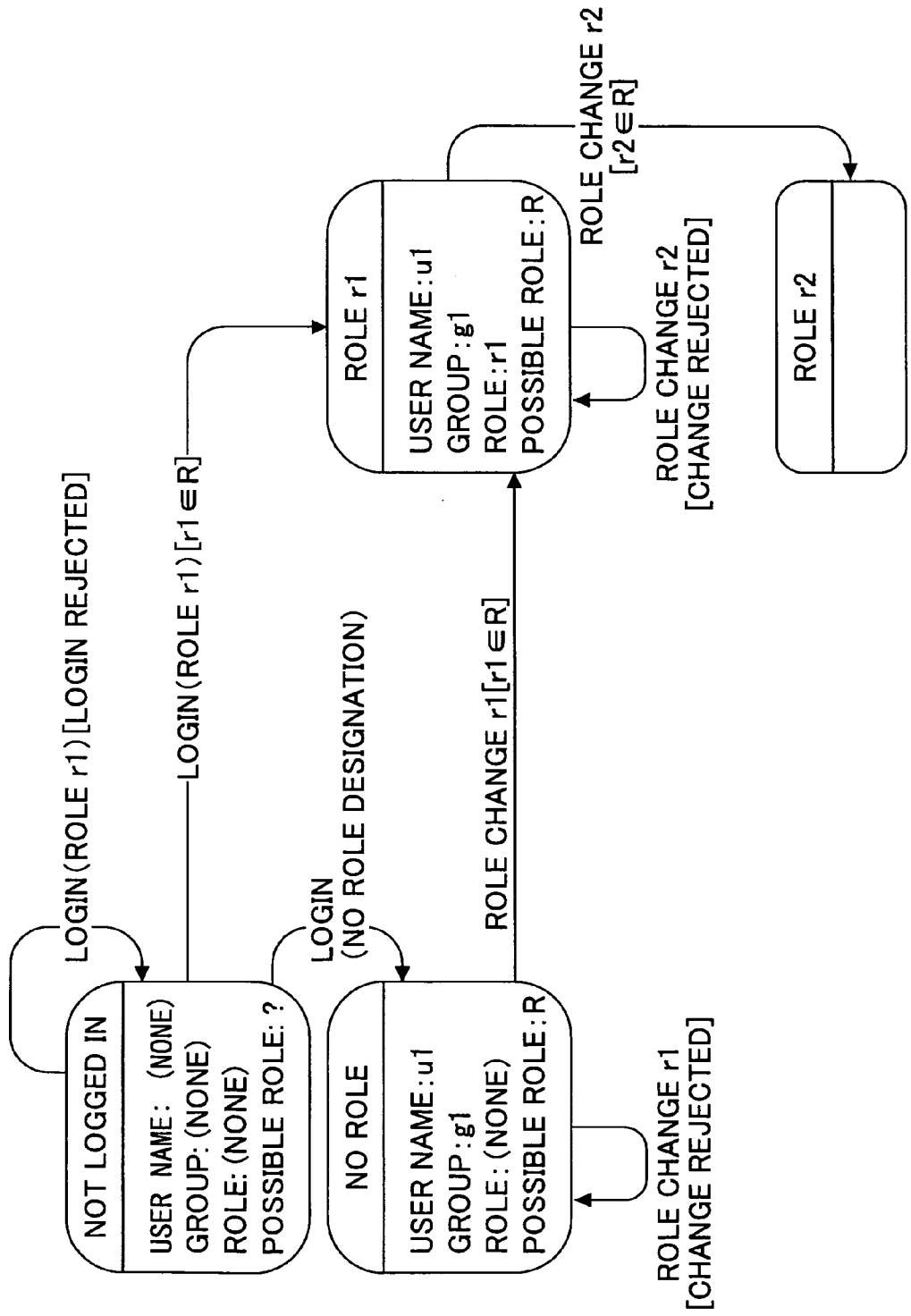
FIG. 18 shows an abstracted state transition diagram for the role.

FIG. 18 shows an abstracted state transition diagram for the role. The state transition diagram of FIG. 18 is merely an abstraction of the state transition diagrams shown in FIGS. 16 and 17; thus, its description is omitted.

Figure 19:
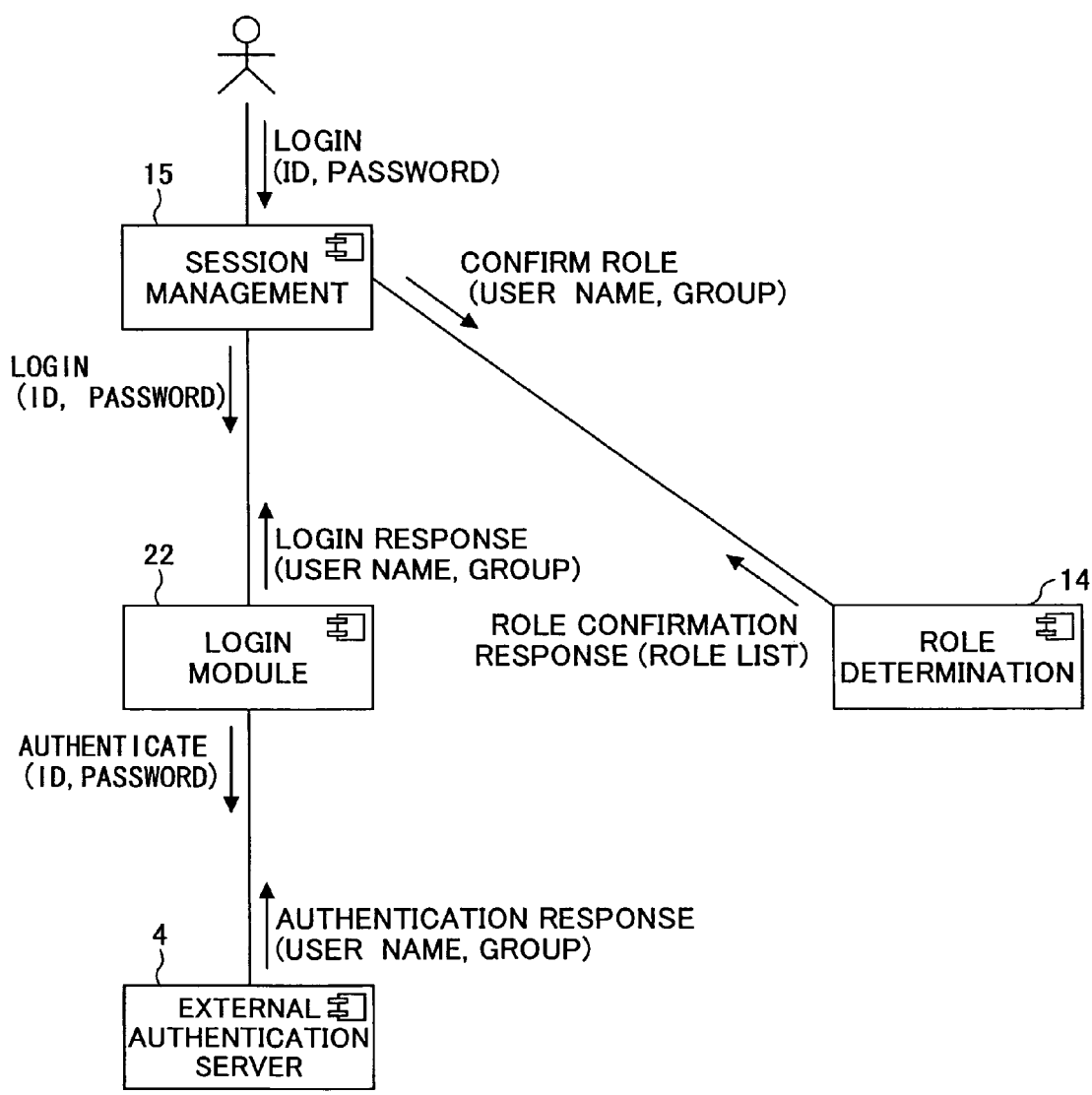
FIG. 19 illustrates a variation of an authentication scheme utilized by a multifunction peripheral according to an embodiment.

FIG. 19 shows a variation of the authentication method employed in the multifunction peripheral according to the present embodiment. A session managing unit 15 receives an operator's login. The session managing unit 15, using an ID and a password entered by the operator, requests a login from the login module 22. The login module 22, using the ID and password entered by the operator, requests authentication from an external authentication server 4.

The external authentication server 4, using the ID and password entered by the operator, conducts authentication. Upon successful authentication, the external authentication server 4 transmits a user name or group corresponding to the ID and password to the login module 22 as an authentication response.

The login module 22 transmits the user name or group that it receives as the authentication response to the session managing unit 15 as a login response. The session managing unit 15, using the user name or group that it receives as the login response, and the aforementioned role list designated by the operator, requests role confirmation from the role determination unit 14.

The role determination unit 14, using the aforementioned role management table, conducts role confirmation based on whether the role list designated by the operator corresponds to the user name or group received as the login response. When the role confirmation result is successful, the role list is sent to the session managing unit 15 as a role confirmation result.

Figure 20:
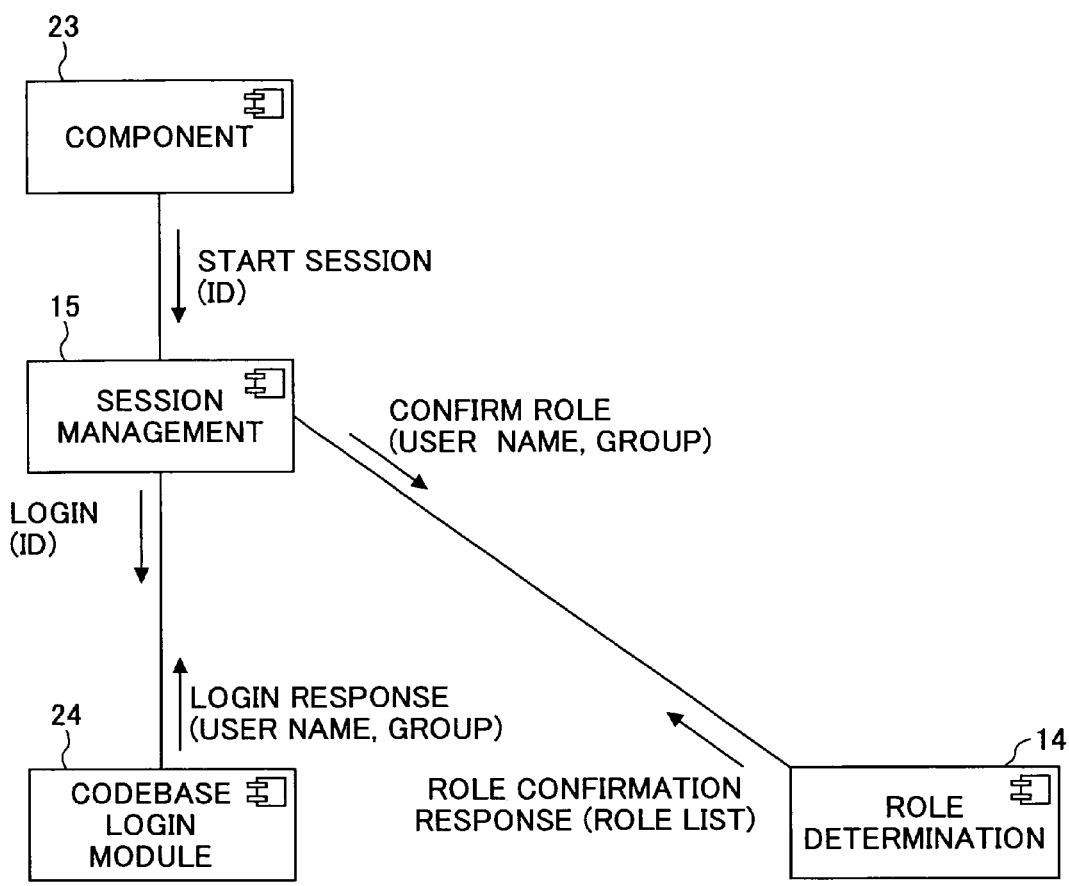
FIG. 20 illustrates another variation of the authentication scheme utilized by a multifunction peripheral according to an embodiment.

FIG. 20 shows another variation of the authentication method used in the multifunction peripheral according to the present embodiment. The session managing unit 15 receives a session start request from a component 23. The component 23 conducts CE authentication (key combination) and acquires privileges upon system startup.

The session managing unit 15, using an ID, requests a login from a codebase login module 24. The codebase login module 24 attempts a login using the ID; upon successful login, the module transmits a user name or group corresponding to the ID to the session managing unit 15 as a login response. The session managing unit 15, using the user name or group received as the login response and the aforementioned role list designated by the operator, requests role confirmation from the role determination unit 14.

The role determination unit 14, using the aforementioned role management table, conducts role confirmation based on whether the role list designated by the operator corresponds to the user name or group received as the login response. When the role confirmation result is successful, the role list is sent to the session managing unit 15 as a role confirmation result.

Embodiment 2

Figure 21:
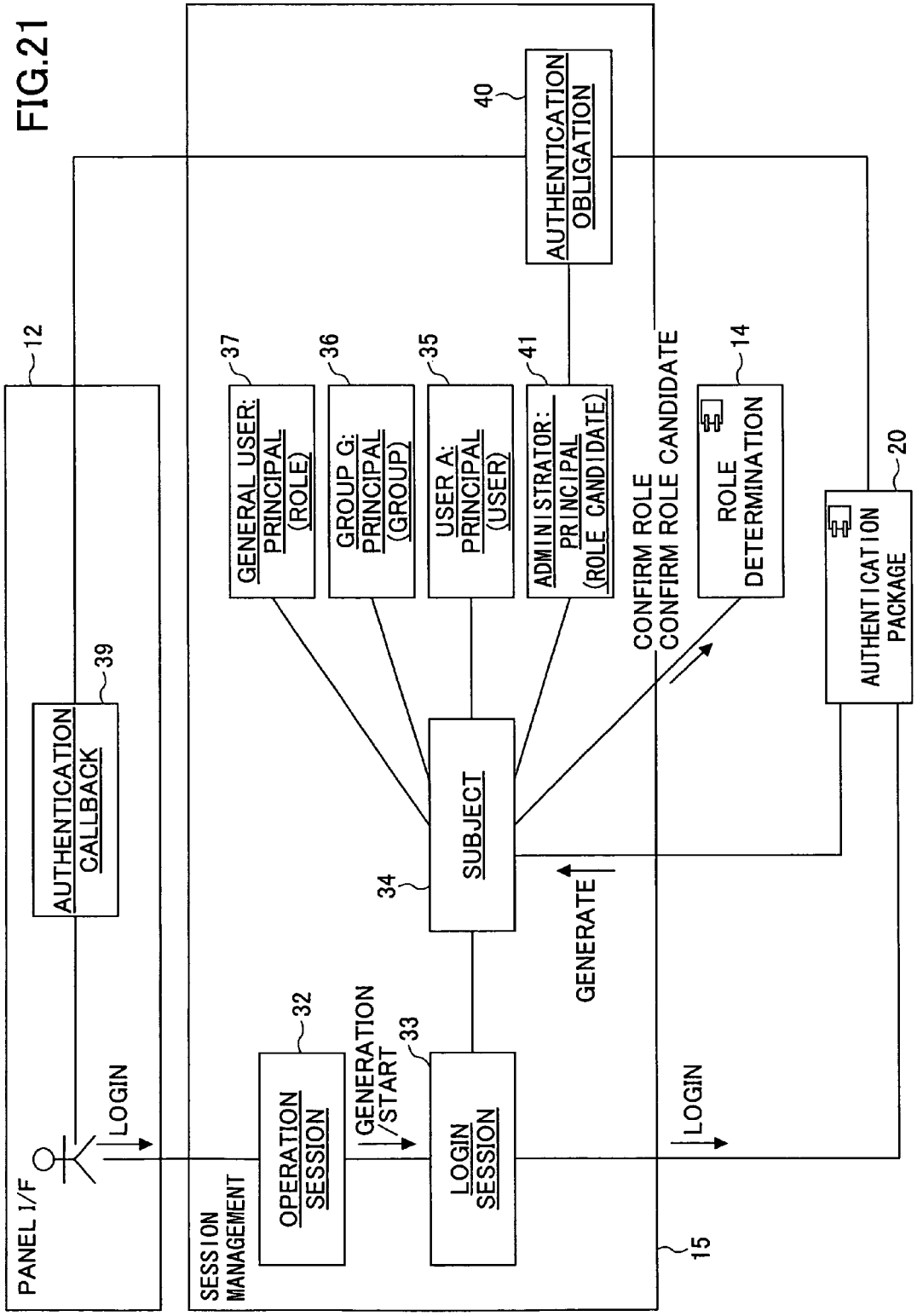
FIG. 21 shows a collaboration diagram of another example of a session management mechanism.
Figure 22:
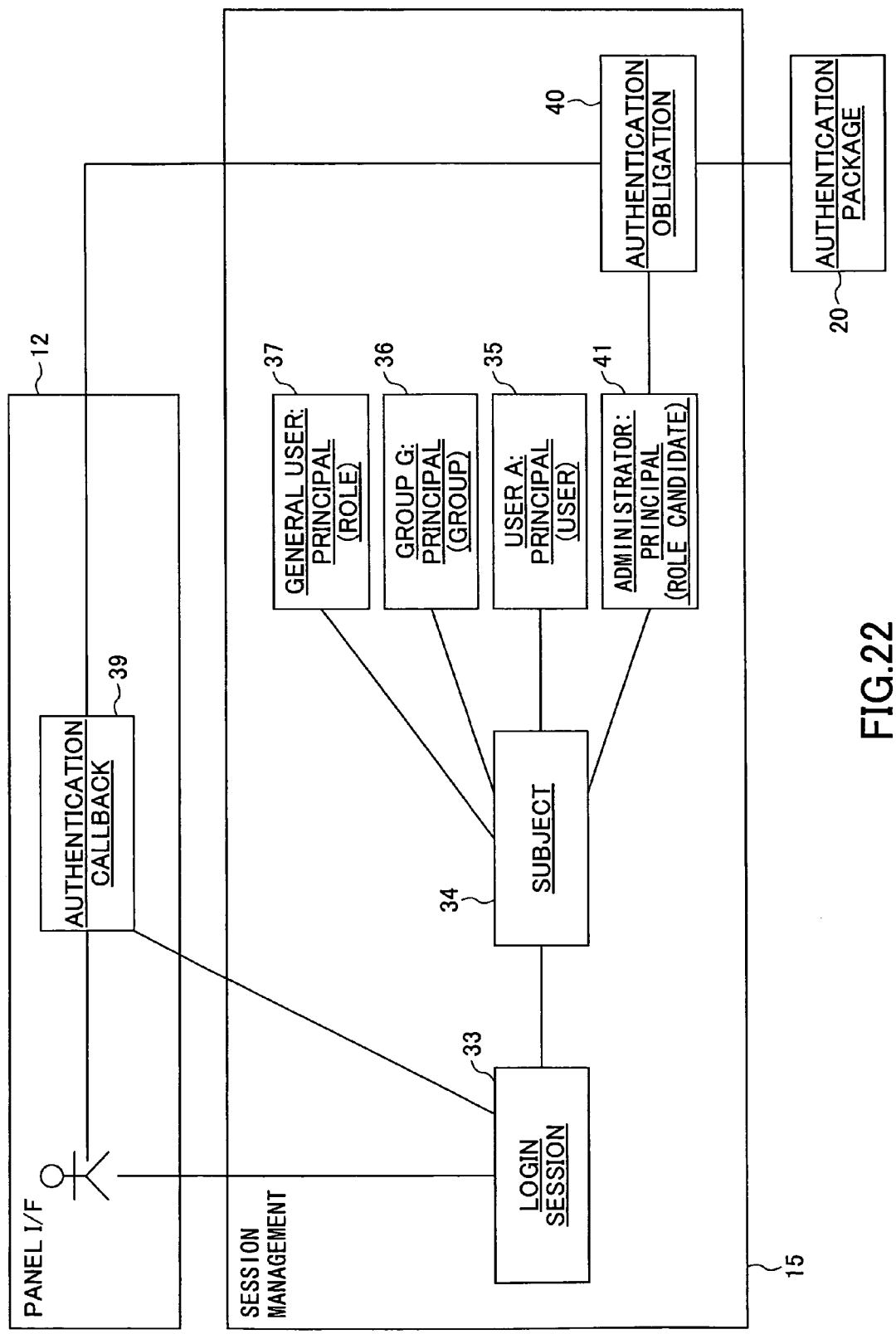
FIG. 22 shows an object diagram of a multifunction peripheral in which one-shot authentication is conducted.

FIG. 21 shows a collaboration diagram of another example of a session management mechanism. FIG. 22 shows an object diagram of a multifunction peripheral in which one-shot authentication is conducted. FIG. 23 shows a sequence chart of a process sequence in the session management mechanism. The one-shot authentication involves confirming role candidates of an operator in advance at the time of confirmation of a role designated by the operator upon login.

With reference to FIG. 21, a panel I/F 12 includes an authentication callback 39 as an object. A session managing unit 15 includes an operation session 32, a login session 33, a subject 34, principals 35 to 37, an authentication obligation 40, and a principal 41 for a role candidate as objects. The authentication obligation 40 manages what type of authentication should be conducted for each combination of the source principal, which represents user name or group, and the role.

The operator designates a role ("role list") via the panel I/F 12, and enters his ID and password to log in. In step S61, the operation session 32 of the session managing unit 15 receives the operator's login. The operation session 32 in step S62 generates the login session 33.

In step S63, the operation session 32 requests the login session 33 to start authentication. In step S64, the login session 33 requests from the authentication callback 39 the role list designated by the operator and the authentication information entered by the operator, i.e., the ID and password, thus acquiring the designated role list, ID, and password.

In step S65, the login session 33, using the ID and password acquired in step S64, requests the authentication package 20 to conduct authentication and generate a principal.

Upon successful authentication, the authentication package 20 in step S66 generates the subject 34 and supplies a user name or group associated with the ID and password to the subject 34 as an authentication response. The subject 34 generates principals other than those of the role and the role candidate, i.e., the principals 35 and 36.

In step S67, the subject 34, using the role list designated by the operator and the user name or group supplied from the authentication package 20 in step S66, requests the role determination unit 14 to confirm the role and the role candidate. The role determination unit 14, using a role management table that is described below, conducts role confirmation based on whether the role list designated by the operator corresponds to the user name or group supplied by the subject 34.

Also, the role determination unit 14, using the role management table as described below, confirms the role candidate corresponding to the user name or group supplied from the subject 34. The role determination unit 14 then notifies the subject 34 of a role confirmation result and a role candidate confirmation result.

When the role confirmation results are successful, the subject 34 in step S68 generates the principal 37 for the role in accordance with the designated role list, and begins a session. In step S69, the subject 34 generates the principal 41 for the role candidate in accordance with the confirmed role candidate.

FIG. 24 shows another example of the role management table. In this example, the role management table associates the source principal, which represents user name or group, with the role and the obligation. In the role management table of FIG. 24, a user name "Kitahara" is associated with a role "Device administrator" and an obligation "Device local authentication (login via an account with a device administrator privilege)". A group "Accounts" is associated with a role "User administrator" and an obligation "PKI authentication using IC card".

Figure 25:
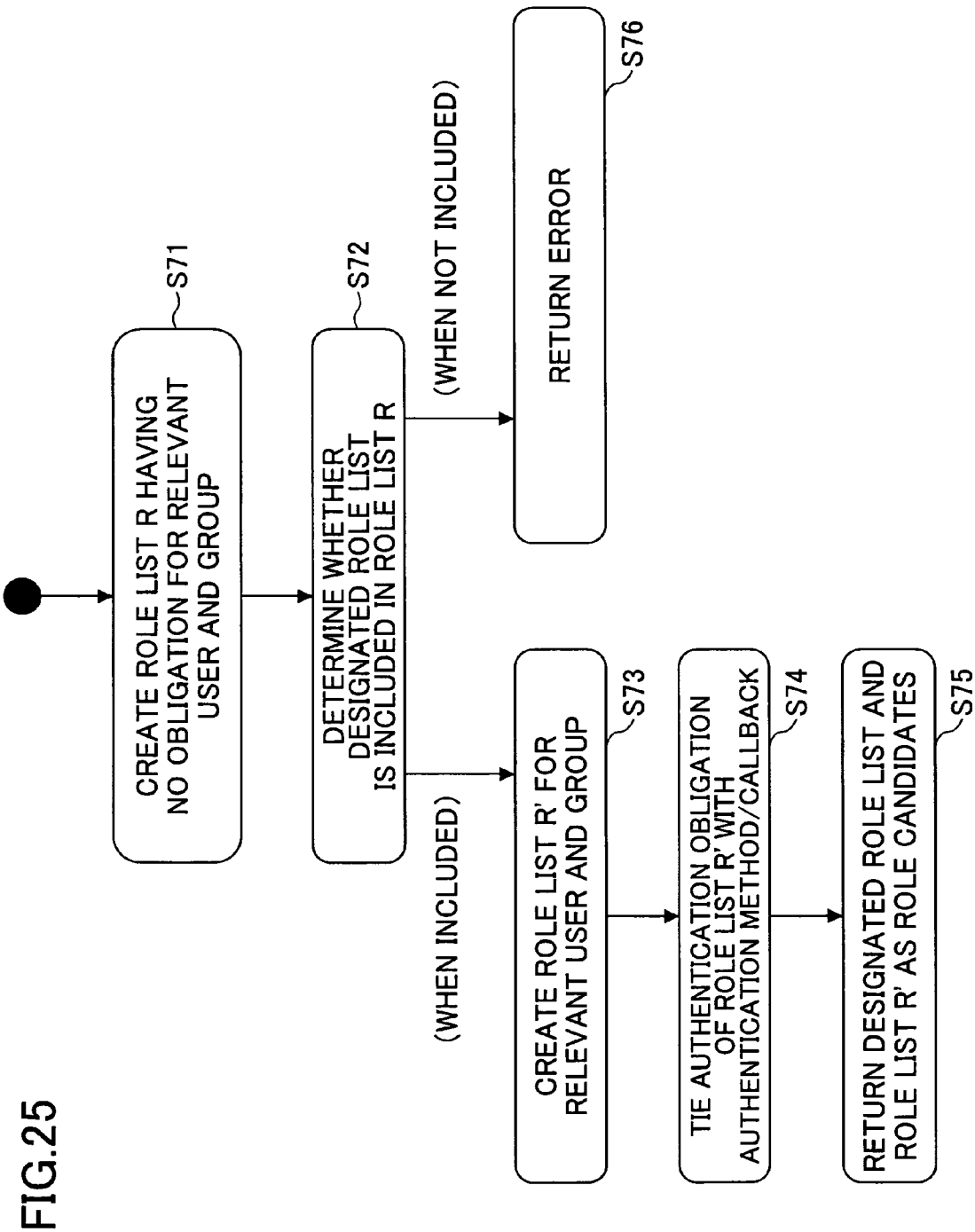
FIG. 25 shows a flowchart of a role/role candidate confirmation process performed in a role determination unit.

FIG. 25 shows a flowchart of a role/role candidate confirmation process performed in the role determination unit. In step S71, the role determination unit 14, using the role management table of FIG. 24, creates a role list R corresponding to the user name or group supplied by the subject 34 and having no obligation. In step S72, the role determination unit 14 determines whether the role list designated by the operator is included in the role list R created in step S71.

When the role list designated by the operator is included in the role list R created in step S71, the role determination unit 14 in step S73 creates, using the role management table of FIG. 24, a role list R' corresponding to the user name or group and having an obligation.

In step S74, the role determination unit 14 ties the obligation of the role list R' with an authentication method/callback. In step S75, the role determination unit 14 returns the role list designated by the operator, and also the role list R' as a role candidate. When the role list designated by the operator is not included in the role list R created in step S71, the role determination unit 14 returns an error to the operator.

Role Change

The session management mechanism according to the present embodiment has the function of allowing an operator who has logged in to change his role. The role change mechanism in accordance with the present embodiment is described below.

Figure 26:
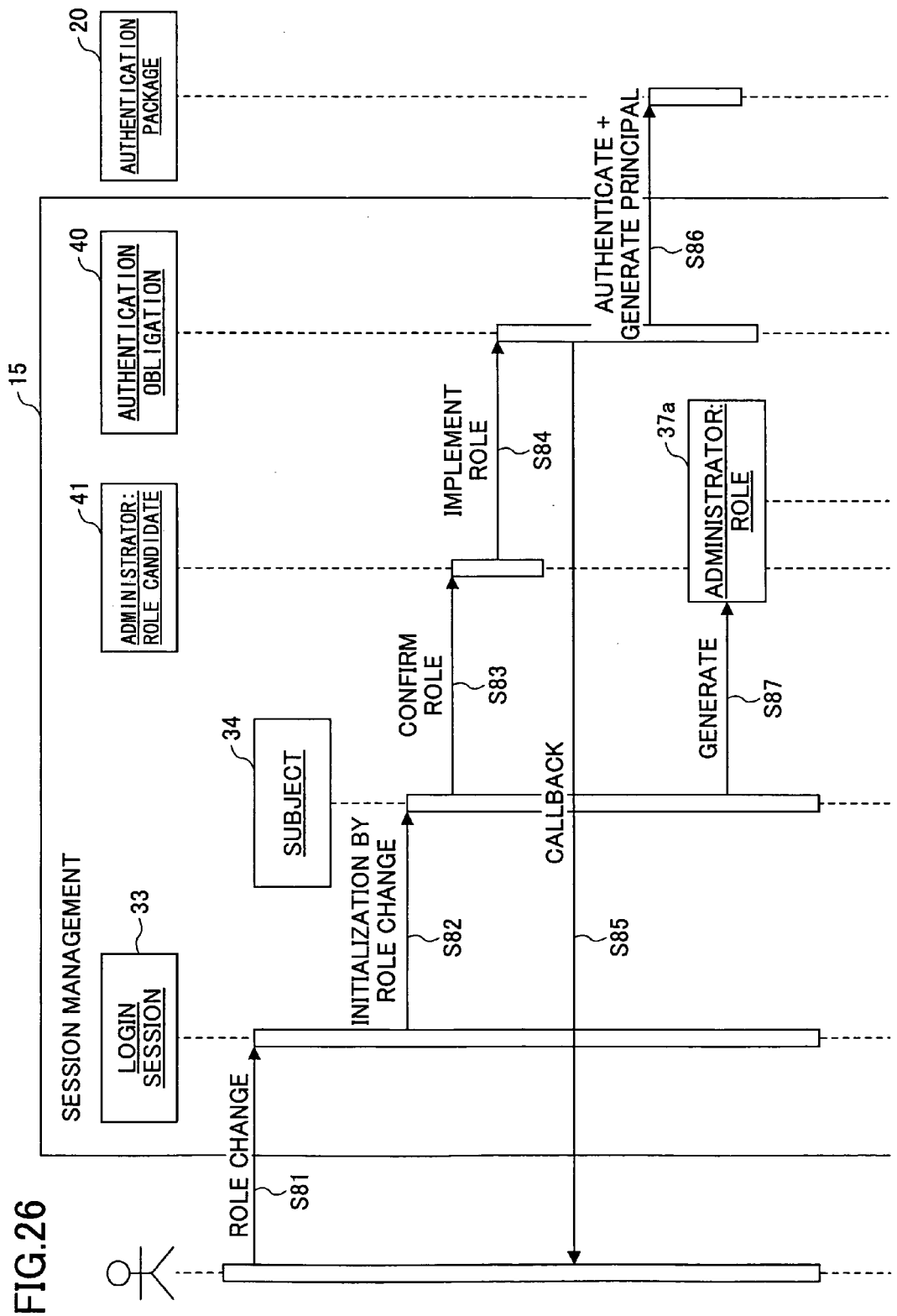
FIG. 26 shows a sequence chart for a role change process sequence.

FIG. 26 shows a sequence chart of a role change process. An operator requests role change via the panel I/F 12. In step S81, the login session 33 of the session managing unit 15 receives the role change request. In step S82, the login session 33 requests the subject 34 to conduct initialization by role change. In step S83, the subject 34 requests from the principal 41 role confirmation confirming if a changed role is included in the role candidate.

When the role confirmation result is successful, the principal 41 of the role candidate in step S84 requests the authentication obligation 40 to conduct authentication. In step S85, the authentication obligation 40 acquires authentication information from the authentication callback 39. In step S86, the authentication obligation 40 requests the authentication package 20 to conduct authentication and generate a principal. Upon successful authentication by the authentication package 20, the subject 34 in step S87 generates a principal 37a of the changed role, and begins a session.

Figure 27:
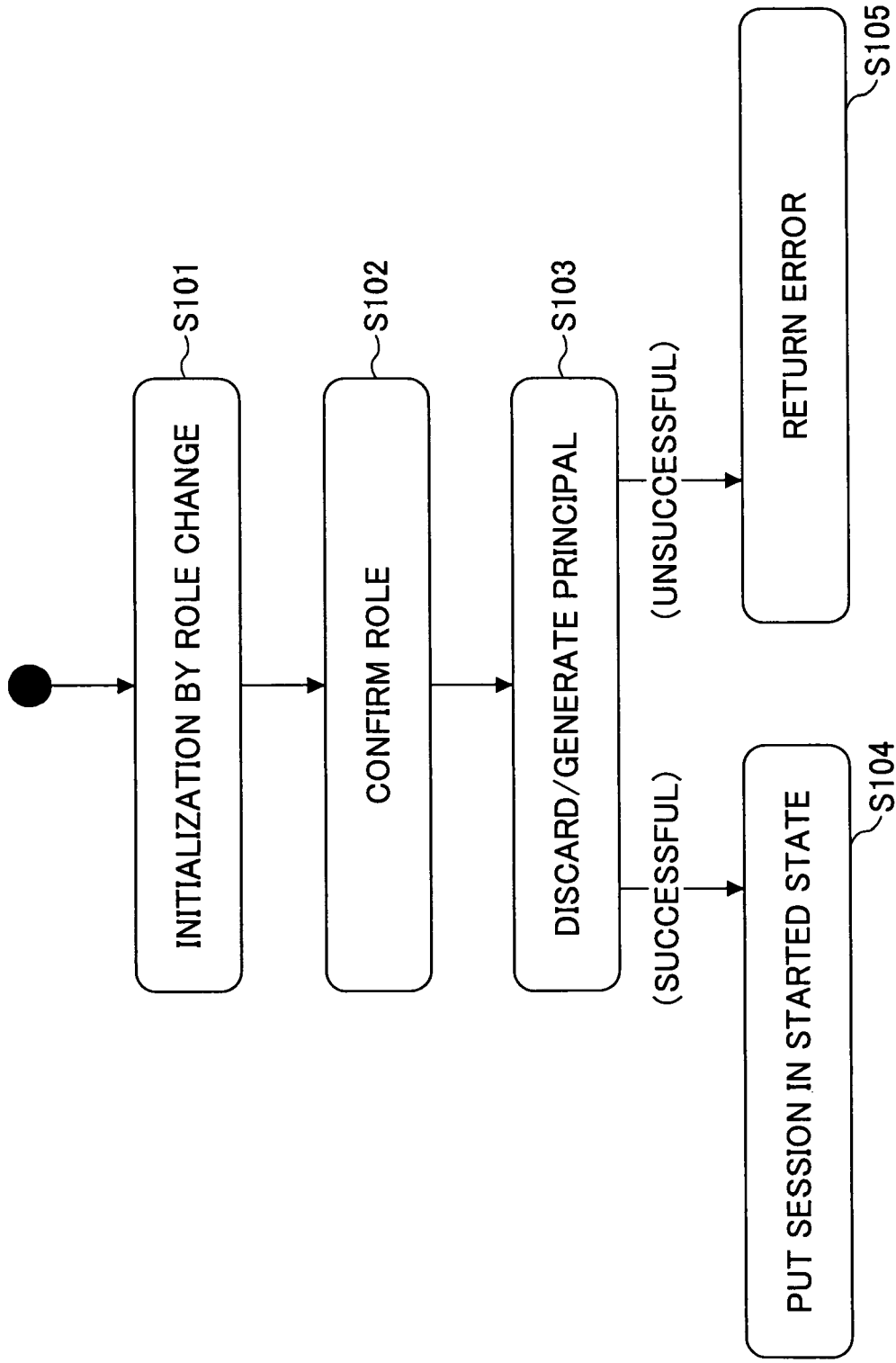
FIG. 27 shows a flowchart of a session start process upon role change.

FIG. 27 shows a flowchart of a session start sequence upon role change. In step S101, the login session 33 requests the subject 34 to perform initialization by role change. In step S102, the subject 34 requests the principal 41 of a role candidate to conduct role confirmation to confirm whether the changed role is included in the role candidate.

When the role confirmation result is successful, the principal 41 of the role candidate requests the authentication obligation 40 to conduct authentication. The authentication obligation 40 acquires authentication information from the authentication callback 39. The authentication obligation 40 requests the authentication package 20 to perform authentication and generate a principal.

Upon successful authentication by the authentication package 20, the subject 34 generates the principal 37a for the changed role and, in step S104, begins a session. When the role confirmation result or the authentication, result is unsuccessful, the subject 34 in step S105 returns an error to the operator.

Figure 28:
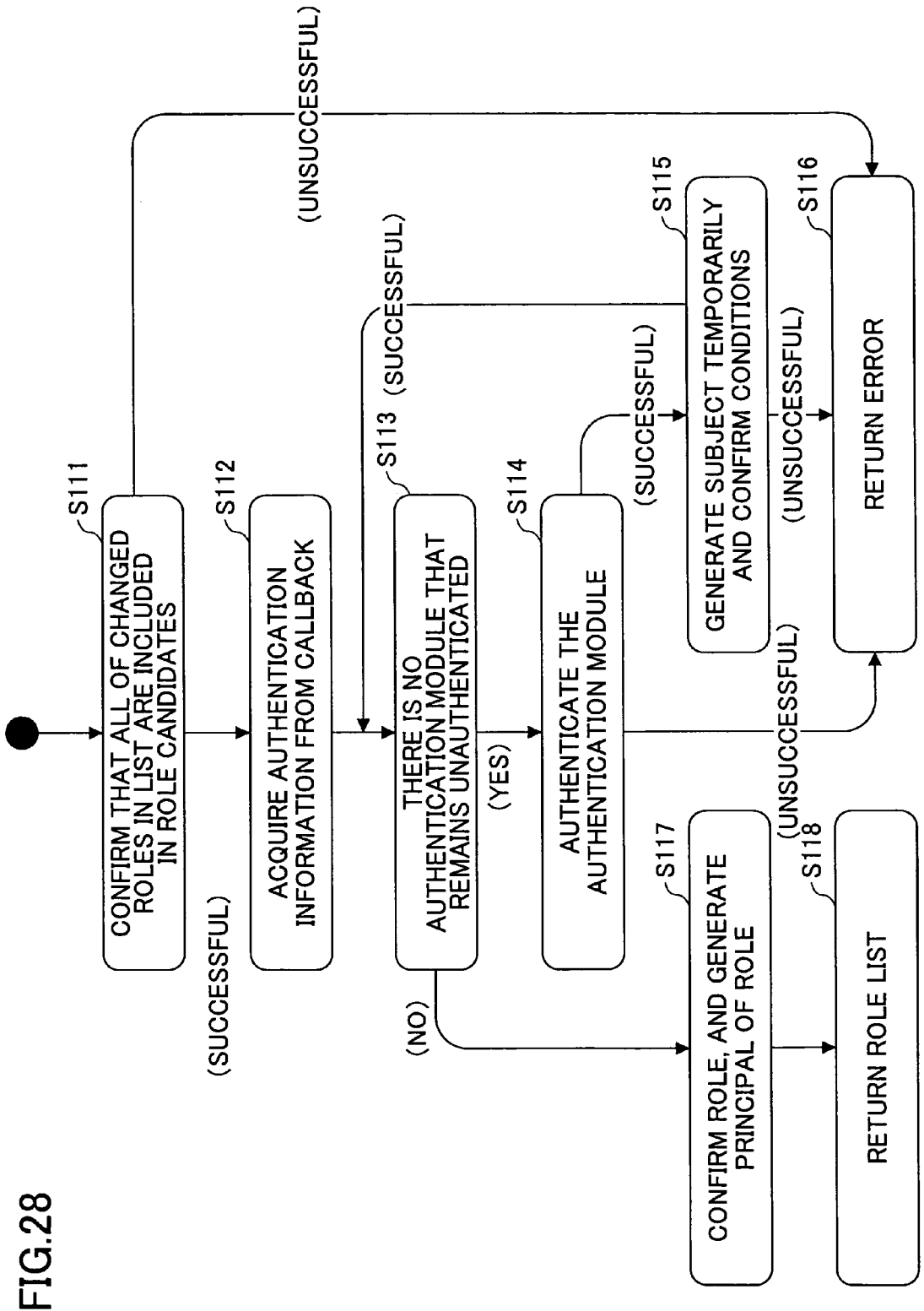
FIG. 28 shows a flowchart of a role confirmation and authentication process upon role change.

Hereafter, role confirmation and authentication are described with reference to FIG. 28 showing a flowchart of a role confirmation and authentication process upon role change.

In step S111, the principal 41 of the role candidate confirms if all of the roles (role lists) are included in the role candidates. When all of the changed role lists are included in the role candidates (successful), the principal 41 of the role candidate in step S112 requests the authentication obligation 40 to conduct authentication. The authentication obligation 40 acquires authentication information from the authentication callback 39.

In step S113, the authentication obligation 40 confirms whether there is any authentication package or authentication module for which no authentication has been performed. If there is an authentication package or authentication module that has not been authenticated, the authentication obligation 40 in step S114 requests authentication and conducts authentication.

Upon successful authentication, the authentication package or the authentication module in step S115 temporarily generate a subject and confirm conditions. Upon successful generation of the subject and confirmation of the conditions, the authentication obligation 40 returns to step S113.

When not all of the changed role lists are included in the role candidates (unsuccessful), upon unsuccessful authentication in step S114, or upon unsuccessful generation of the subject and confirmation of the conditions in step S115, an error is returned to the operator in step S116.

If it is determined in step S113 that there is no authentication package or authentication module that has not been authenticated, the subject 34 in step S117 discards the principal 37 of the role prior to change, and generates the principal 37a with the changed role. In step S118, the principal 41 of the role candidate returns the changed role list to the subject 34.

Thus, in accordance with the multifunction peripheral 1 of the present embodiment, the authentication obligation 40 based on the role is used, whereby the mechanism for additional authentication, such as one-shot authentication, can be simplified. Further, in the multifunction peripheral 1 of the present embodiment, policy control can be added upon role change from administrator to user by, for example, inheriting a time-out value.

Although this invention has been described in detail with reference to certain embodiments, variations and modifications exist within the scope and spirit of the invention as described and defined in the following claims.

For example, a session managing program in accordance with an embodiment of the present invention may be recorded in a recording medium so that the program can be loaded into the multifunction peripheral 1.

The present application is based on the Japanese Priority Application No. 2007-238263 filed Sep. 13, 2007, the entire contents of which are hereby incorporated by reference.

What is claimed is:

1. An image processing apparatus including at least one of a plotter unit and a scanner unit, in which an operation is allowed or prohibited depending on a role of an operator who is logged in, the image processing apparatus comprising:
    a session managing unit configured to,
        manage information about the operator who is logged in between a login and a logout of the operator as a session,
        generate a login session upon the login of the operator,
        request authentication information associated with the operator and a role list designated by the operator,
        generate a subject based on a result of the authentication,
        generate one or more principals associated with a role other than the role of the operator based on a result of the authentication,
        generate, based on the subject, information indicating the operator, a group to which the operator belongs, and an existing role of the operator,
        generate, based on the subject and the role list, information indicating a group and the role other than the role of the operator,
        initialize the subject based on a request from the operator for a role change,
        generate information indicating a new role based on a confirmed role of the operator after the role change, and
        begin a session by selecting one of the one or more principals based on the new role;
    an application unit designed for a specific purpose; and
    an access control unit configured to control access to the session managing unit by the application unit, wherein
        the login session is used to generate a ticket that includes information for association with the subject, and
        the access control unit that, based on a privilege confirmation request from the application unit, identifies the subject using the ticket, and performs privilege confirmation by referring to the information indicating the identified operator, the group to which the operator belongs, the existing role of the operator, and the role of the operator after the role change.

2. The image processing apparatus according to claim 1, further comprising:
    an authentication unit configured to,
        authenticate the operator based on a request from the session managing unit,
        perform the authentication using authentication information about the operator, and
        upon successful authentication, notify the subject of the operator and the group to which the operator belongs that are associated with the authentication information about the operator.

3. The image processing apparatus according to claim 1, further comprising:
a role determination unit configured to,
determine a role of the operator based on a request from the session managing unit, and
confirm, using a role management table that associates the operator with the group to which the operator belongs, whether the request for role change from the operator is appropriate based on whether the role of the operator after role change is associated with the operator or the group to which the operator belongs.

4. The image processing apparatus according to claim 3, wherein the role determination unit is further configured to,
create, using the role management table, a list of roles of the operator in association with the operator and the group to which the operator belongs, and
confirm whether the request for role change from the operator is appropriate based on whether the role of the operator after role change is included in the list of the roles of the operator.

5. The image processing apparatus according to claim 1, wherein the session managing unit transitions among a state that is not logged in, a state that is logged in without an associated role, a state that is logged in by designating an associated role, and a state in which a role is changed by designating an associated role, wherein the state with the changed role that transitions from the state that is logged in by designating the associated role manages a session after the role change.

6. The image processing apparatus according to claim 2, wherein the authentication unit authenticates the operator using an external authentication apparatus connected via a network.

7. A session managing method for allowing or prohibiting an operation by an operator who is logged into an image processing apparatus including at least one of a plotter unit and a scanner unit depending on a role of the operator, the method comprising:
generating a login session upon the login of the operator;
requesting authentication information associated with the operator and a role list designated by the operator;
generating a subject based on a result of the authentication;
generating one or more principals associated with a role other than the role of the operator based on a result of the authentication;
generating, based on the subject, information indicating the operator, a group to which the operator belongs, and an existing role of the operator;
generating, based on the subject and the role list, information indicating a group and the role other than the role of the operator;
initializing the subject based on a request from the operator for a role change;
generating information indicating a new role based on a confirmed role of the operator after the role change;
beginning a session by selecting one of the one or more principals based on the new role;
generating a ticket that includes information for association with the subject during the login session; and
identifying the subject using the ticket based on a privilege confirmation request from the application unit, and performing privilege confirmation by referring to the information indicating the identified operator, the group to which the operator belongs, the existing role of the operator, and the role of the operator after the role change.

8. A non-transitory computer readable medium including a program for allowing or prohibiting an operation by an operator who is logged into an image processing apparatus including at least one of a plotter unit and a scanner unit depending on a role of the operator, the program, when executed by one or more processors of the image processing apparatus, causes the one or more processors to function as:
a session managing unit configured to,
generate a login session upon the login of the operator,
request authentication information associated with the operator and a role list designated by the operator,
generate a subject based on a result of the authentication,
generate one or more principals associated with a role other than the role of the operator based on a result of the authentication,
generate, based on the subject, information indicating the operator, a group to which the operator belongs, and an existing role of the operator,
generate, based on the subject and the role list, information indicating a group and the role other than the role of the operator,
initialize the subject based on a request from the operator for a role change,
generate information indicating a new role based on a confirmed role of the operator after the role change,
begin a session by selecting one of the one or more principals based on the new role; and
an access control unit configured to control access to the session managing unit and to,
generate a ticket that includes information for association with the subject during the login session; and
identify the subject using the ticket based on a privilege confirmation request from the application unit, and perform privilege confirmation by referring to the information indicating the identified operator, the group to which the operator belongs, the existing role of the operator, and the role of the operator after the role change.

* * * * *

UNITED STATES PATENT AND TRADEMARK OFFICE
CERTIFICATE OF CORRECTION

| | | |
|---|---|---|
| PATENT NO. | : 8,365,275 B2 | Page 1 of 1 |
| APPLICATION NO. | : 12/232257 | |
| DATED | : January 29, 2013 | |
| INVENTOR(S) | : Segawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this
Thirteenth Day of January, 2015

Michelle K. Lee
*Deputy Director of the United States Patent and Trademark Office*